US012724876B2

(12) United States Patent
Taneja et al.

(10) Patent No.: US 12,724,876 B2
(45) Date of Patent: Sep. 1, 2026

(54) HYBRID SECURITY MODEL FOR REMOTE BROWSER ISOLATION (RBI) TO PROTECT AGAINST WEB-BASED THREATS

(71) Applicant: Bank of America Corporation, Charlotte, NC (US)

(72) Inventors: Pushkar Taneja, Hyderabad (IN); Suryanarayana Adivi, Hyderabad (IN); Jemlin Lucas, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 52 days.

(21) Appl. No.: 19/011,962

(22) Filed: Jan. 7, 2025

(65) Prior Publication Data

US 2026/0195443 A1 Jul. 9, 2026

(51) Int. Cl.
*G06F 21/53* (2013.01)
*G06F 21/55* (2013.01)
*G06F 21/56* (2013.01)
*G06F 21/62* (2013.01)

(52) U.S. Cl.
CPC ............ *G06F 21/53* (2013.01); *G06F 21/554* (2013.01); *G06F 21/566* (2013.01); *G06F 21/6218* (2013.01); *G06F 2221/034* (2013.01)

(58) Field of Classification Search
CPC . H04L 63/102; H04L 63/1483; H04L 63/168; H04L 67/02; G06F 21/554; G06F 21/566; G06F 21/6218; G06F 2221/034
See application file for complete search history.

(56) References Cited

U.S. PATENT DOCUMENTS

| | | | | |
|---|---|---|---|---|
| 9,355,247 | B1 * | 5/2016 | Thioux | G06F 21/53 |
| 10,198,574 | B1 * | 2/2019 | Thioux | G06F 21/55 |
| 10,542,031 | B2 * | 1/2020 | Petry | G06F 21/53 |
| 10,552,639 | B1 * | 2/2020 | Buzbee | G06F 21/6245 |
| 10,686,824 | B2 * | 6/2020 | Petry | H04L 67/563 |
| 11,032,309 | B2 * | 6/2021 | Petry | H04L 67/1097 |
| 11,178,104 | B2 * | 11/2021 | Coleman | G06F 21/53 |
| 11,310,260 | B2 * | 4/2022 | Petry | H04L 45/306 |

(Continued)

*Primary Examiner* — Sharon S Lynch
(74) *Attorney, Agent, or Firm* — Banner & Witcoff, Ltd.

(57) ABSTRACT

The present invention relates to a hybrid security model for Remote Browser Isolation (RBI) environments to protect against web-based threats while ensuring secure and efficient application execution. The invention integrates sandboxing and application preapproval to enhance security and performance. Sandboxing isolates critical processes, preventing interference and containing malicious activities. A process isolation algorithm assigns dedicated resources, ensuring independent task execution. A resource limitation algorithm restricts CPU, memory, and disk space usage, optimizing resource allocation. Network access control prioritizes network resources for critical tasks, while file system virtualization limits access to specific files. Behavior monitoring algorithms detect and contain unauthorized activities, raising alerts in real time. Application preapproval improves efficiency by allowing trusted applications to bypass the isolation layer. By combining proactive threat detection, dynamic resource management, and granular access control, the invention delivers robust protection, ensuring secure and reliable operation of web applications across RBI environments.

20 Claims, 6 Drawing Sheets

(56) References Cited

U.S. PATENT DOCUMENTS 11,563,766 B2 * 1/2023 Petry .................. H04L 63/1408
11,675,930 B2 * 6/2023 Buzbee .................. G06F 9/452 726/23
11,700,266 B2 * 7/2023 Silverstein ........... H04L 63/101 726/1
11,797,636 B2 * 10/2023 Largo Del Amo ......................... G06F 16/9577
11,799,970 B1 * 10/2023 Kandaswamy ....... H04L 67/141
12,093,383 B2 * 9/2024 Ladnai .................... G06F 21/56
12,093,429 B2 * 9/2024 Buzbee .................. G06F 21/71
12,153,674 B2 * 11/2024 Ladnai .................... G06F 21/56
12,192,227 B2 * 1/2025 Petry ...................... H04L 67/02
12,381,916 B2 * 8/2025 Ganguli .................. H04L 63/08
12,417,253 B2 * 9/2025 Largo Del Amo ......................... G06F 16/9577
12,488,060 B2 * 12/2025 Silverstein ............. H04L 65/75
12,536,280 B2 * 1/2026 Ladnai .................... G06F 21/56
2019/0075130 A1 * 3/2019 Petry .................. H04L 63/0209
2019/0097970 A1 * 3/2019 Coleman ............ H04L 63/0236
2020/0228561 A1 * 7/2020 Petry .................. H04L 63/0428
2020/0252413 A1 * 8/2020 Buzbee ................ G06F 21/629
2020/0348662 A1 11/2020 Cella et al.
2021/0157312 A1 5/2021 Cella et al.
2021/0297394 A1 * 9/2021 Petry .................. H04L 63/1408
2022/0083046 A1 3/2022 Cella et al.
2022/0083047 A1 3/2022 Cella et al.
2022/0083048 A1 3/2022 Cella et al.
2022/0108262 A1 4/2022 Cella et al.
2022/0163959 A1 5/2022 Cella et al.
2022/0163960 A1 5/2022 Cella et al.
2022/0385671 A1 * 12/2022 Silverstein .......... H04L 63/1408
2023/0026368 A1 * 1/2023 Silverstein ............. H04L 65/75
2023/0098519 A1 3/2023 Cella et al.
2023/0111071 A1 4/2023 Cella et al.
2023/0118204 A1 * 4/2023 Ladnai .................... G06F 21/56 726/23
2023/0135882 A1 5/2023 Cella et al.
2023/0171284 A1 * 6/2023 Petry .................. H04L 63/1433 713/168
2023/0176550 A1 6/2023 Cella et al.
2023/0176557 A1 6/2023 Cella et al.
2023/0186200 A1 6/2023 Cella et al.
2023/0186201 A1 6/2023 Cella et al.
2023/0195058 A1 6/2023 Cella et al.
2023/0196229 A1 6/2023 Cella et al.
2023/0196230 A1 6/2023 Cella et al.
2023/0196231 A1 6/2023 Cella et al.
2023/0281527 A1 9/2023 Cella et al.
2023/0342500 A1 * 10/2023 Buzbee ............... G06F 21/6245
2024/0004948 A1 * 1/2024 Largo Del Amo ......................... G06F 16/9577
2024/0283826 A1 * 8/2024 Ganguli .............. H04L 63/0281
2025/0141915 A1 * 5/2025 Petry .................. H04L 63/0428
2025/0350647 A1 * 11/2025 Ganguli .................. H04L 63/08
2026/0080026 A1 * 3/2026 Largo .................. G06F 16/9577

* cited by examiner

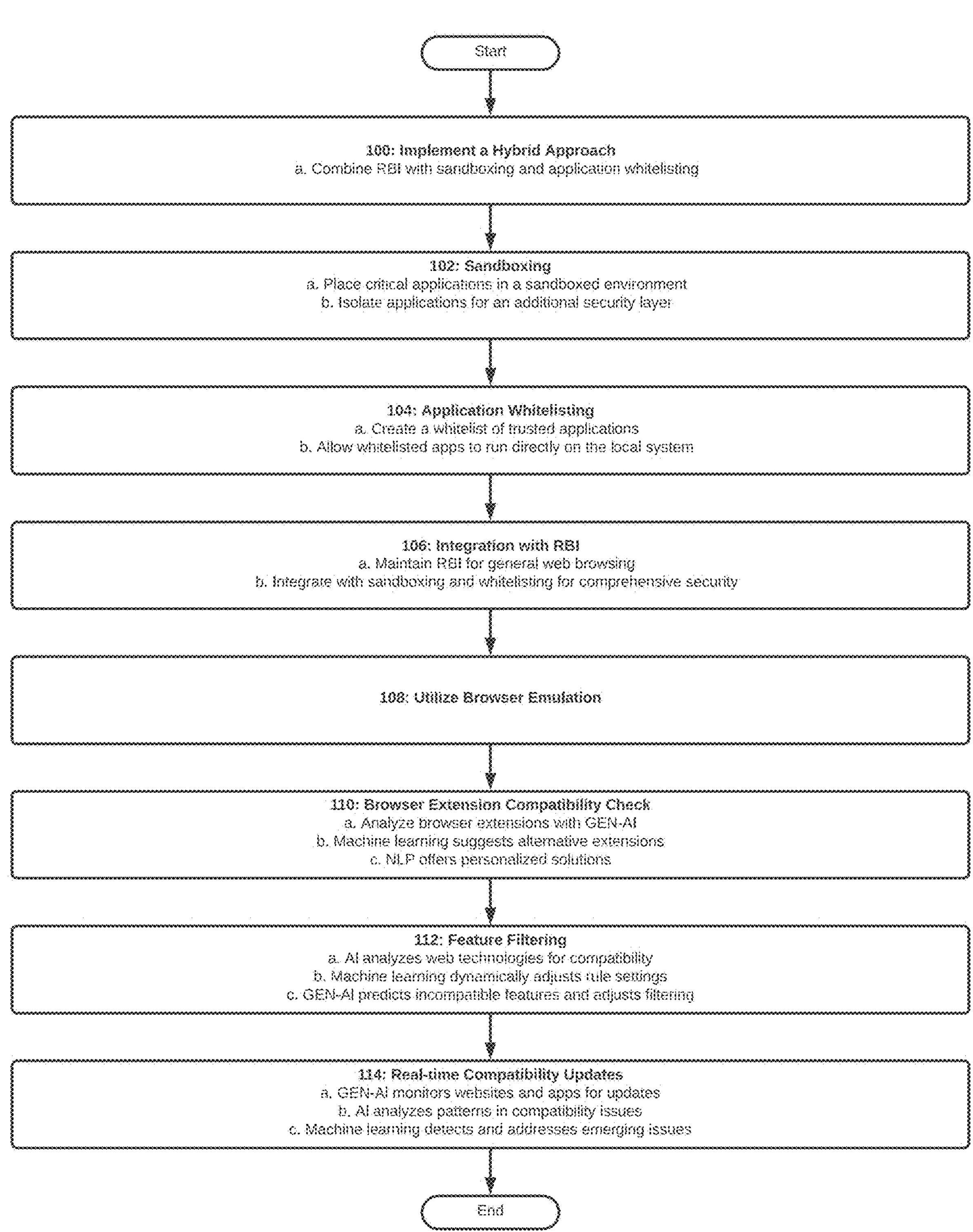
FIG. 1: Sample Process Flow

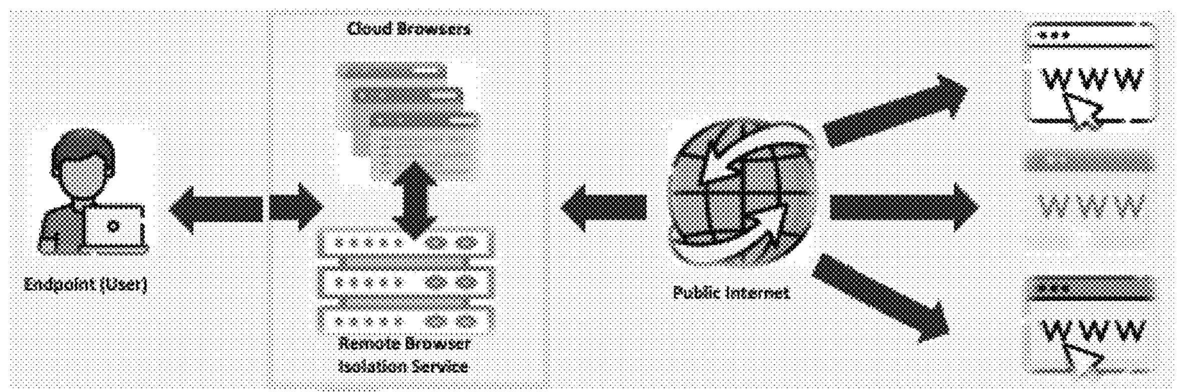
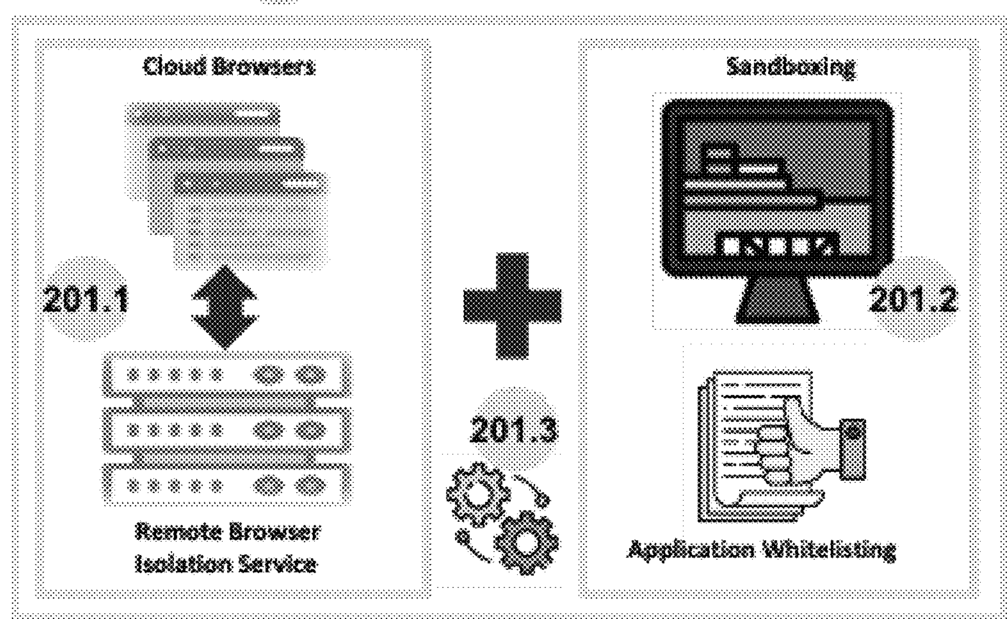
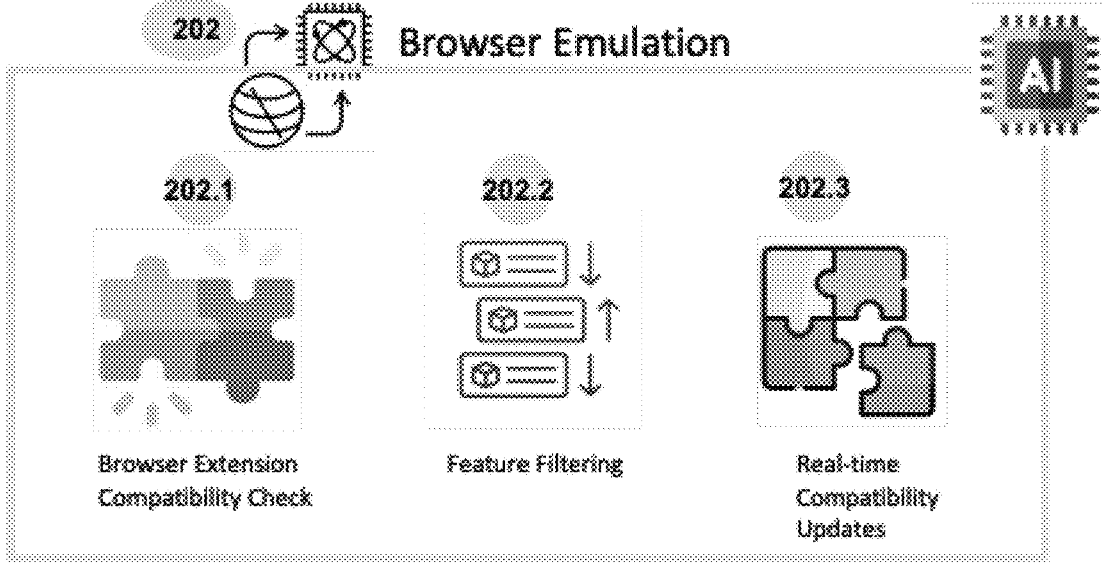
FIG. 2: Sample Architecture

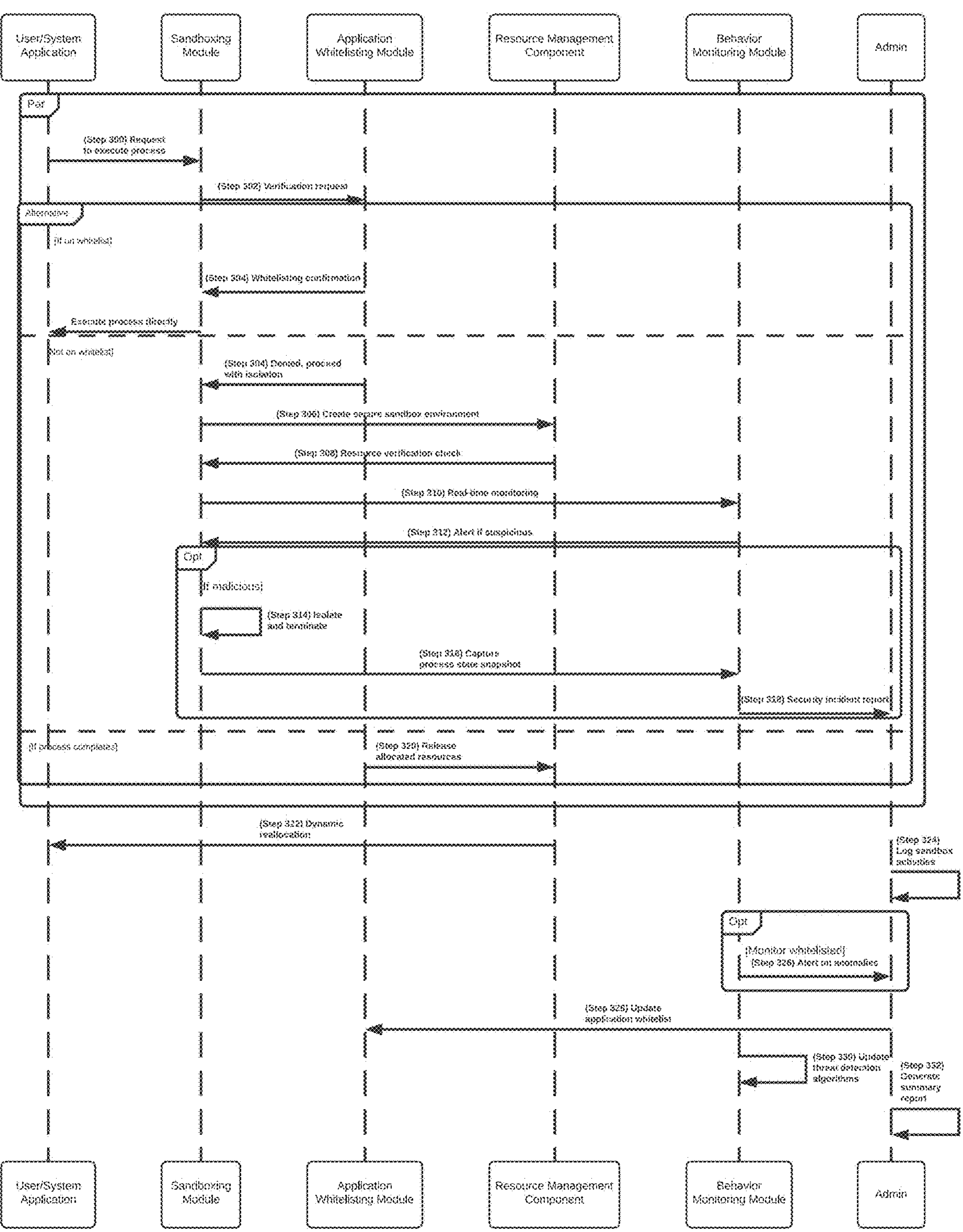
FIG. 3: Sample Sequence Diagram for One Aspect of the Inventions

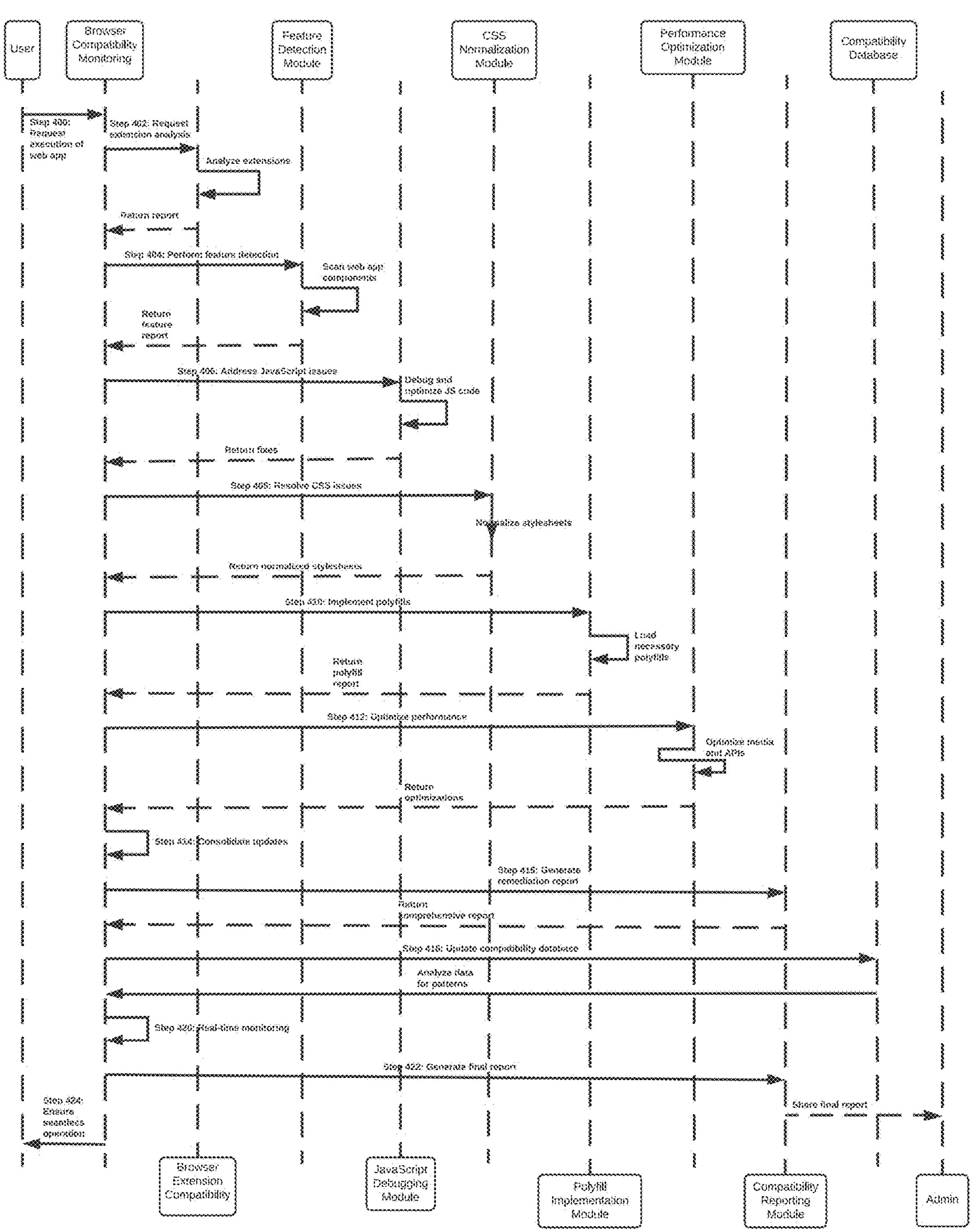
FIG. 4: Sample Sequence Diagram for Another Aspect of the Inventions

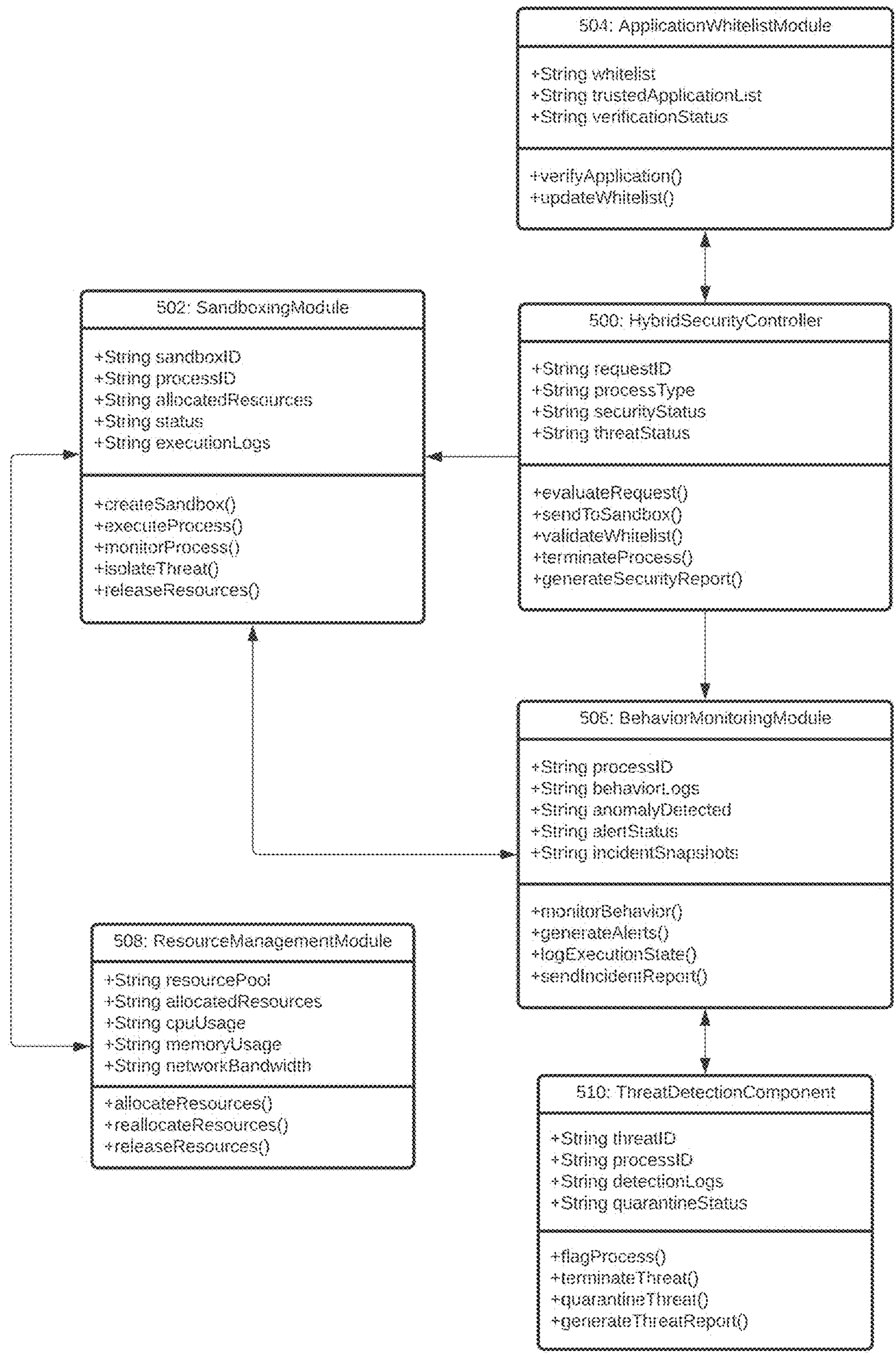
FIG. 5: Class Diagram for One Aspect of Invention

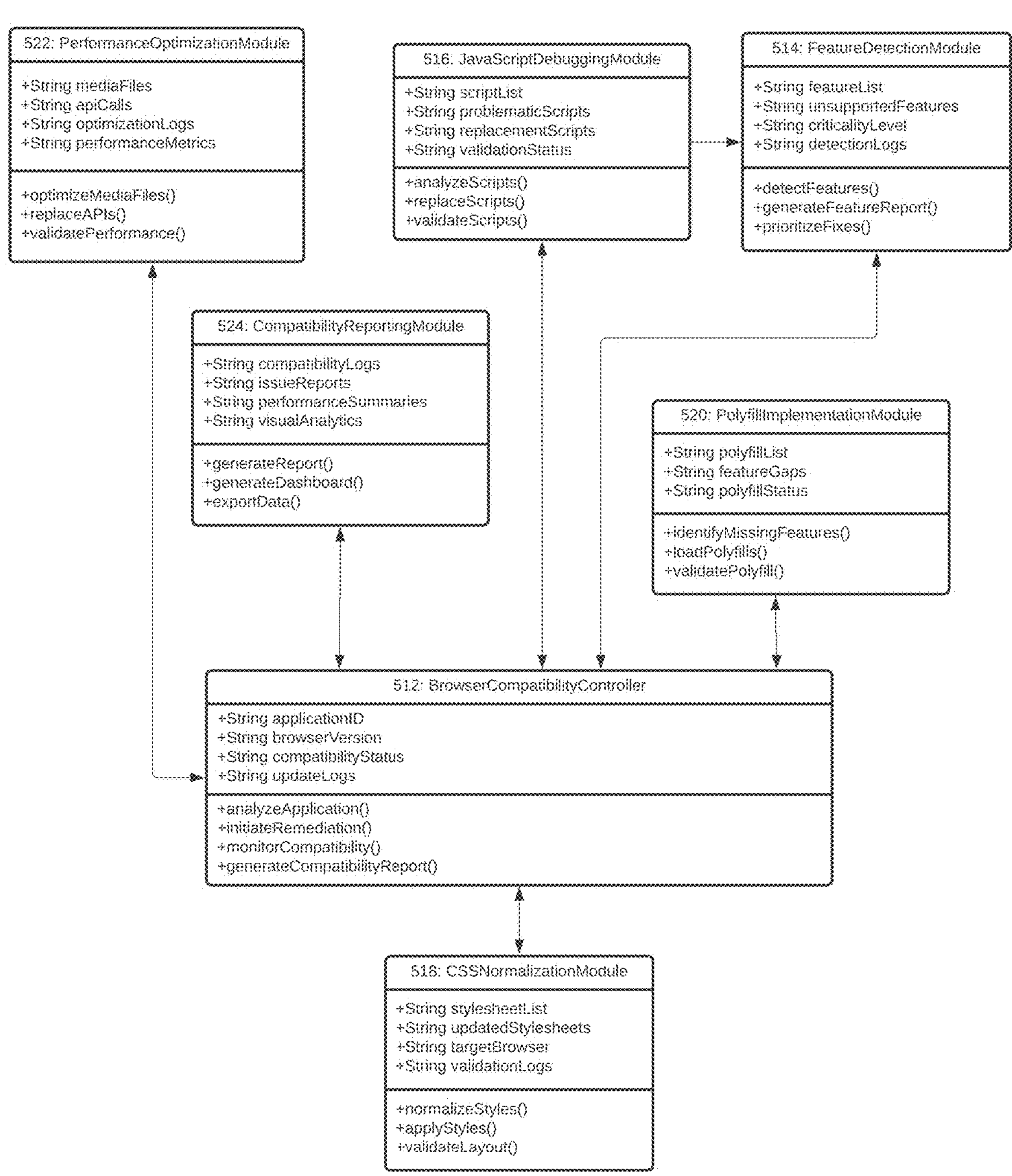
FIG. 6: Class Diagram for Another Aspect of Invention

HYBRID SECURITY MODEL FOR REMOTE BROWSER ISOLATION (RBI) TO PROTECT AGAINST WEB-BASED THREATS

TECHNICAL FIELD

The inventions disclosed herein relate to the arrangement of processes and architectures for handling distributed or networked data systems, particularly those that focus on interconnecting or isolating processes. The hybrid security model, which combines remote browser isolation (RBI), sandboxing, and application pre-approval, fits into this class by providing a structured architecture for isolating browser activity in secure environments while managing resource allocation and network communication. Simultaneously, the dynamic remediation approach, which leverages browser emulation and Generative AI (GenAI), ensures compatibility across distributed systems by analyzing, optimizing, and dynamically configuring web applications, enabling seamless execution across varied environments.

DESCRIPTION OF THE RELATED ART

In today's digital environment, organizations increasingly rely on web-based applications and services to perform essential operations, communicate with clients, and conduct critical business activities. The shift to browser-based workflows and cloud-hosted solutions has provided organizations with immense flexibility and productivity gains; however, it has also exposed them to significant security vulnerabilities and operational challenges. One such challenge is securing browser activity against cyber threats while ensuring seamless functionality across different environments. Remote Browser Isolation (RBI) has emerged as a viable solution to protect systems by isolating browser activities in secure remote environments, thereby shielding user devices and networks from potentially malicious web content. While RBI solutions provide strong protection against cyber threats, they introduce compatibility issues that hinder the performance, functionality, and usability of websites and applications when deployed in diverse and distributed environments.

The compatibility problems associated with RBI environments arise primarily due to variations in browser technologies, API implementations, and script execution processes across platforms. Websites and web applications are often developed to perform optimally in specific browser versions or environments, such as Chrome, Firefox, or Safari. However, when these applications are executed in an RBI environment, the isolation server may utilize a different browser version or runtime configuration. This discrepancy can lead to severe compatibility issues where some features fail to render correctly, certain scripts do not execute as intended, or the entire functionality of the application becomes partially or fully impaired. For example, a website that relies on modern JavaScript libraries may function perfectly in one browser but fail in another due to the absence of critical APIs or incompatible runtime settings, leading to a frustrating user experience and operational inefficiencies.

The problem is further exacerbated by the growing complexity of modern web applications, which often incorporate dynamic content, third-party integrations, and advanced front-end technologies such as responsive web design, asynchronous JavaScript execution, and interactive user interfaces. In RBI environments, these technologies may face unexpected challenges when executed under isolated conditions. As an example, some interactive website elements might work seamlessly in a Chrome-based environment but fail to function in Internet Explorer due to differences in CSS, Javascript versions, or feature support. Similarly, media content such as high-resolution images or videos might load efficiently in one browser but experience significant performance delays in another due to incompatible rendering engines or inefficient file formats. These issues can have cascading effects, disrupting critical processes, reducing application efficiency, and lowering user satisfaction.

Moreover, the compatibility issues inherent in RBI environments pose significant challenges for organizations that rely on legacy systems or applications that are not designed for modern browsers or isolated environments. Legacy systems may depend on outdated technologies or browser features that are no longer supported in modern RBI servers. As organizations attempt to transition to RBI solutions, they face significant hurdles in maintaining compatibility with these systems while adhering to their security requirements. This forces organizations to either abandon critical legacy applications, invest heavily in costly redevelopment efforts, or settle for suboptimal user experiences. Additionally, organizations often lack the expertise or tools to manually analyze, identify, and resolve these compatibility issues, further compounding the problem and delaying the adoption of secure isolation technologies.

In addition to technical challenges, compatibility issues create operational inefficiencies that impact productivity and user satisfaction. Employees and users accessing web applications through RBI environments may experience inconsistent performance, broken features, or incomplete functionality, which can disrupt workflows and reduce efficiency. For instance, an employee attempting to process financial transactions or access sensitive client data through an RBI environment may encounter delays, errors, or crashes if the underlying web application is incompatible with the isolation server's runtime settings. These issues force IT teams to spend significant time troubleshooting and resolving compatibility problems, diverting resources away from other critical tasks and increasing overall maintenance costs. As organizations strive to maintain seamless operations while securing their web environments, the inability to address these compatibility issues becomes a major barrier.

The problem extends beyond individual organizations and impacts users on a broader scale, particularly in industries that rely heavily on secure and high-performance web-based applications. Financial institutions, for example, require flawless execution of payment processing systems, account access portals, and transaction workflows to serve their customers efficiently. If compatibility issues arise within RBI environments, these applications may experience downtime, transaction failures, or degraded performance, eroding customer trust and leading to financial losses. Similarly, government agencies and e-commerce platforms rely on web applications for critical operations such as data sharing, service delivery, and customer engagement. Compatibility issues in these environments can compromise service delivery, result in lost revenue, and damage organizational reputation.

Furthermore, the absence of an automated and intelligent approach to resolving compatibility challenges forces organizations to rely on reactive and manual solutions that are both inefficient and unsustainable. Traditional methods of addressing compatibility issues often involve extensive testing, manual patching, and reconfiguration efforts, which are time-consuming and resource-intensive. These methods also fail to account for the dynamic nature of modern web applications, which frequently update and evolve with new features, technologies, and versions. As applications change, compatibility issues can reemerge, forcing organizations to continuously invest time and resources in identifying and fixing the same recurring problems. This reactive approach creates a cycle of inefficiency and frustration, preventing organizations from fully leveraging the benefits of RBI environments while maintaining optimal application performance.

The problem is further amplified by the increasing reliance on multi-browser environments and diverse user preferences. In a distributed workforce, employees and users may access web applications using a variety of browsers and devices, each with its own unique runtime settings and compatibility requirements. Ensuring that applications perform consistently across all these environments is a complex and challenging task, particularly in RBI environments where isolation servers must accommodate diverse browser configurations. Organizations that fail to address these challenges risk alienating users, reducing productivity, and compromising the overall effectiveness of their RBI deployments. Moreover, the growing complexity of browser technologies, such as the introduction of new JavaScript versions, CSS standards, and browser extensions, adds another layer of difficulty in maintaining compatibility across all platforms.

Compatibility issues also create significant security risks that undermine the purpose of implementing RBI environments in the first place. When organizations are unable to resolve compatibility challenges, they may be forced to bypass the isolation environment for certain applications, thereby exposing their systems to potential cyber threats. For example, an organization may allow critical applications to run locally on user devices to avoid compatibility issues, inadvertently creating vulnerabilities that malicious actors can target. This compromises the integrity and security of the organization's systems, defeating the primary purpose of implementing RBI solutions. Organizations are therefore caught in a dilemma, where they must choose between maintaining security and ensuring seamless application functionality.

The long-felt and unmet need for the invention arises from the increasing complexity of web-based applications, the limitations of existing RBI solutions, and the growing demand for secure yet compatible browser environments. While RBI technologies offer robust protection against web-based threats, their inability to address compatibility issues has hindered widespread adoption and created operational challenges for organizations. There is a critical need for a solution that not only secures browser activity but also ensures seamless compatibility across diverse platforms, browsers, and applications. Organizations require an intelligent, automated, and proactive approach to identify, analyze, and resolve compatibility issues in real time, allowing them to fully leverage the benefits of RBI environments without compromising performance, functionality, or user experience. This invention addresses that long-standing need by overcoming the barriers posed by compatibility challenges while enhancing security, productivity, and operational efficiency across modern web environments.

SUMMARY OF THE INVENTION

The inventions disclosed herein address two critical challenges in the deployment and operation of Remote Browser Isolation (RBI) environments: ensuring robust security against web-based threats and dynamically resolving compatibility issues across diverse browsers and platforms.

One invention focuses on enhancing security in RBI environments through a hybrid security model that integrates sandboxing and application preapproval or whitelisting. Sandboxing isolates critical applications to prevent unauthorized access or interference, ensuring they execute securely without impacting other processes. Application preapproval allows trusted applications or APIs to bypass the isolation layer, thereby improving performance while maintaining security. Together, these approaches protect organizations from web-based threats, such as malware and unauthorized access, while ensuring secure and efficient execution of critical processes.

Another invention tackles compatibility challenges in RBI environments using intelligent browser emulation and dynamic remediation approaches powered by Generative AI (GenAI). The system analyzes browser extensions, APIs, and web technologies to identify and resolve compatibility issues in real time. It ensures seamless functionality across different browsers through features such as cross-browser testing, responsive design adjustments, JavaScript error debugging, CSS normalization, and polyfill implementation. By leveraging machine learning and predictive analysis, the system dynamically adjusts configurations, resolves incompatibilities, and optimizes performance, ensuring that web applications function reliably and consistently across all platforms.

Together, these inventions deliver a comprehensive solution for organizations, enhancing security against web-based threats while ensuring seamless compatibility and performance for web applications in RBI environments.

The first invention pertains to a hybrid security model designed to enhance the safety and performance of Remote Browser Isolation (RBI) environments by integrating sandboxing and application preapproval techniques. Remote Browser Isolation is a web security solution that isolates browser activity from a user's local system by executing all web-based processes in a secure, remote environment. This invention introduces additional security layers to the RBI architecture to protect against malicious threats and unauthorized activities while ensuring efficient resource utilization and seamless user experiences. The hybrid approach combines multiple security mechanisms to provide robust protection and operational efficiency for organizations deploying RBI technology.

At the core of this invention is the use of sandboxing as a security measure to isolate applications and processes within the RBI environment. Sandboxing ensures that critical applications operate in isolated compartments, independent of other processes, so they do not interfere with or impact other tasks running in the system. This isolation prevents any potential threats, such as malware, from propagating beyond the sandbox and compromising the overall system. For example, if an application running in a sandboxed environment is compromised or crashes, its failure is contained within the sandbox, ensuring the integrity and stability of other processes. This feature is particularly useful for applications handling sensitive data, such as payment gateways, financial processing systems, or customer account portals, as it guarantees secure execution without disruption.

The invention further incorporates a process isolation algorithm that assigns specific system resources to individual tasks, ensuring their independence and security. Each process or module running within the RBI environment operates with dedicated CPU, memory, and network resources, preventing resource contention and enhancing system performance. For instance, if a user is performing a financial transaction, the system allocates dedicated resources to that transaction to ensure its uninterrupted execution. By isolating processes and assigning resources independently, the invention minimizes the risk of failures, latency, or delays caused by resource conflicts, thereby improving reliability and efficiency.

Another critical aspect of the invention is the resource limitation algorithm, which restricts the consumption of CPU, memory, and disk space to specific tasks. This feature ensures that each process in the RBI environment uses only the resources allocated to it, preventing resource monopolization by any single task. For example, if a module requires a large amount of processing power, the system dynamically allocates the required resources while preventing it from consuming resources reserved for other tasks. Once the process completes, the resources are released and reallocated to other modules as needed. This intelligent resource management ensures efficient utilization of system resources while maintaining optimal performance across all processes.

The invention also introduces a network access control algorithm that prioritizes network resources based on task sensitivity and importance. Tasks deemed high-priority or sensitive, such as secure financial transactions, are assigned dedicated network resources to ensure their smooth execution. In contrast, lower-priority tasks are allocated shared or limited network resources. This network prioritization mechanism reduces latency, prevents bottlenecks, and guarantees efficient communication for critical processes. For example, a payment transaction requiring high-speed connectivity will receive prioritized network resources to ensure seamless and secure processing, while less critical background tasks receive lower bandwidth.

To further enhance security, the invention implements file system virtualization, which restricts access to specific files or data required by a process. Instead of granting processes access to the entire file system, the invention assigns read and write permissions only for the files necessary for a given task. This granular access control minimizes the risk of unauthorized file access, data leaks, or accidental modifications. For example, if a module requires access to a specific database file, the system grants permission only for that file and denies access to other sensitive data or resources. This controlled access enhances security by reducing the attack surface and protecting critical information from potential threats.

The invention includes behavior monitoring algorithms to detect and respond to unauthorized activities or suspicious behavior within the RBI environment. These algorithms continuously analyze system behavior, identifying anomalies such as unauthorized file access, abnormal network activity, or malicious scripts. When suspicious activities are detected, the system generates alerts for the administrative team and takes appropriate actions to contain the threat. For example, if an unauthorized process attempts to access sensitive data, the system flags the behavior, isolates the process, and notifies the administrator. This proactive threat detection mechanism enhances security by identifying and mitigating risks in real time.

Application preapproval is another core feature of the invention, providing a mechanism to ensure that only trusted applications or APIs can bypass the RBI environment and execute directly on the local system. The IT security team prepares a list of approved applications based on organizational policies, and only these trusted applications are allowed to run. For instance, enterprise productivity tools or custom-built software critical to business operations are added to the white-list, allowing them to bypass the isolation layer without compromising security. Untrusted applications or scripts must undergo authentication and verification before being allowed to execute. This mechanism improves performance by eliminating unnecessary security checks for trusted applications while maintaining robust protection against potentially malicious software.

The invention's hybrid security model integrates sandboxing, application preapproval, and behavior monitoring to create a comprehensive security strategy that balances performance and protection. By combining these security mechanisms, the invention ensures that critical processes and applications run securely without being affected by other activities in the RBI environment. For example, an organization hosting sensitive financial applications can leverage sandboxing to isolate these processes, application preapproval to bypass unnecessary authentication steps, and behavior monitoring to detect and respond to suspicious activities. This layered approach enhances the security and reliability of RBI environments while addressing potential performance bottlenecks.

The invention also improves system efficiency by dynamically managing resources and processes. The intelligent allocation of CPU, memory, and network resources ensures that critical tasks receive the resources they need without interfering with other processes. Similarly, the controlled access to files and granular permissions prevents resource conflicts and improves system stability. The combination of process isolation, resource limitation, and network prioritization optimizes overall performance, enabling secure and efficient execution of web applications in RBI environments.

The hybrid security model ensures seamless integration with existing RBI solutions, making it adaptable to various organizational needs. Organizations can implement sandboxing and application preapproval alongside RBI environments to create an additional layer of protection against cyber threats. The invention's flexible architecture supports both legacy and modern web applications, ensuring compatibility with diverse systems and environments. For example, organizations using legacy financial systems can isolate these applications using sandboxing while allowing modern productivity tools to bypass the RBI environment through application preapproval.

Incorporating advanced behavior monitoring mechanisms enhances the invention's ability to detect and respond to emerging cyber threats. By analyzing real-time system behavior, the invention identifies potential vulnerabilities or attacks and takes immediate action to contain the risk. This proactive threat mitigation ensures that organizations remain protected against malware, unauthorized access, and other security challenges. For instance, if malicious scripts attempt to compromise a web application, the behavior monitoring algorithms detect the activity, isolate the process, and notify the administrator, preventing further damage.

The invention is designed to address the limitations of traditional RBI environments, which often struggle with performance issues, resource conflicts, and security vulnerabilities. By integrating sandboxing and application preapproval, the invention overcomes these challenges and ensures secure, efficient, and reliable execution of web applications. Organizations can leverage this hybrid model to enhance the security of their browser environments without compromising performance or functionality. For example, an e-commerce platform can use sandboxing to isolate payment processing systems, application preapproval to streamline operations, and behavior monitoring to detect potential threats, ensuring secure and seamless customer transactions.

The hybrid security model is adaptable to various deployment scenarios, including cloud-based, on-premises, and hybrid environments. Its flexible architecture allows organizations to customize the security settings based on their unique requirements, ensuring robust protection and operational efficiency. The invention's ability to manage processes, resources, and access dynamically makes it suitable for industries that rely on secure and high-performance web applications, such as finance, government, and e-commerce. For example, financial institutions can use the invention to secure sensitive data, optimize resource usage, and protect against cyber threats, ensuring reliable and secure transactions for customers.

The long-felt and unmet need addressed by this invention arises from the limitations of existing RBI environments, which lack advanced security mechanisms to protect against modern cyber threats while maintaining performance and efficiency. Traditional RBI solutions provide basic isolation capabilities but often fail to address resource management, process isolation, and proactive threat detection. This invention fulfills that need by introducing a hybrid security model that integrates sandboxing, application preapproval, and behavior monitoring to enhance the security, performance, and reliability of RBI environments. By addressing these longstanding challenges, the invention provides organizations with a comprehensive solution that ensures secure, efficient, and seamless execution of web applications across diverse environments.

The second invention focuses on addressing browser compatibility challenges in Remote Browser Isolation (RBI) environments through an advanced system that employs intelligent browser emulation and dynamic remediation powered by Generative AI (GenAI) and machine learning. Modern web applications rely on a variety of technologies, such as JavaScript libraries, CSS stylesheets, APIs, and browser extensions, all of which must function correctly to deliver a seamless user experience. However, differences in browser versions, configurations, and runtime environments often result in incompatibilities that disrupt the rendering and functionality of these applications. The invention introduces an intelligent solution that dynamically analyzes, predicts, and remediates these compatibility challenges in real time, ensuring that web applications operate reliably across various browsers and platforms.

One of the core features of the invention is its ability to perform browser extension compatibility checks using Generative AI and machine learning. Browser extensions are often essential for enhancing functionality or enabling custom features within a web application. However, some extensions may not be compatible with specific browser environments used in RBI servers. The system intelligently analyzes browser extensions and identifies compatibility issues by leveraging historical data and real-time analysis. Using natural language processing (NLP), it further personalizes recommendations, suggesting alternative extensions or configurations that ensure consistent application performance. This dynamic compatibility analysis minimizes disruptions caused by incompatible extensions, allowing users to seamlessly interact with web applications regardless of the browser environment.

The invention also incorporates feature filtering, which leverages artificial intelligence to analyze web technologies and dynamically adjust rule settings for compatibility. Web applications often utilize advanced technologies, such as asynchronous JavaScript calls, dynamic DOM manipulations, and interactive APIs, that may not function correctly in certain RBI environments. The system identifies which features or technologies are likely to cause compatibility issues and applies alternative rule sets to filter or adjust these features dynamically. By predicting incompatibilities, the system ensures that web applications maintain functionality without compromising security or performance. For example, if a JavaScript library used for image rendering fails to execute properly, the system intelligently adjusts its configuration to use an alternative method that achieves the same outcome.

To address ongoing compatibility issues, the invention features real-time compatibility updates that use Generative AI to monitor websites and applications for changes in their compatibility requirements. Web applications are frequently updated with new versions, features, or technologies, which can introduce incompatibilities within RBI environments. The system continuously monitors these updates and analyzes patterns in compatibility issues, predicting potential challenges before they impact users. By dynamically updating compatibility configurations, the system ensures that applications remain functional as they evolve. For example, if an updated API introduces a new dependency, the system identifies and integrates the required changes automatically, reducing the risk of application downtime or errors.

The invention further enhances the reliability of web applications through cross-browser testing, which ensures that websites perform consistently across different browsers. The system conducts automated tests to evaluate how an application behaves in various browsers, such as Chrome, Firefox, Safari, or Internet Explorer, and identifies discrepancies in rendering, functionality, or performance. If issues are detected, the system applies fixes dynamically, such as redirecting the user to a compatible browser version or applying patches to resolve browser-specific problems. By ensuring cross-browser compatibility, the invention eliminates inconsistencies and provides a uniform user experience regardless of the browser being used.

The invention includes feature detection capabilities that analyze the specific attributes or functionalities of web applications to identify incompatibilities with the RBI environment. Many web applications rely on specific versions of JavaScript, CSS, or APIs to execute certain features, such as dynamic content loading or animation effects. If the required features are not supported in the RBI browser environment, the system identifies alternative approaches that replicate the intended functionality. For instance, if a web application relies on an older version of JavaScript that is incompatible with the RBI server, the system dynamically generates a workaround to ensure that the same behavior is achieved using compatible technologies. This feature allows legacy applications to function reliably without requiring significant redevelopment or updates.

The invention also supports polyfill implementation, which allows new web features to be incorporated into older browser environments. In many cases, web applications are designed using modern standards and APIs that are not supported by legacy browsers. To address this issue, the system implements polyfills-runtime scripts that enable new features to function in older browsers. For example, if a web application requires asynchronous JavaScript calls that are not natively supported in older versions of Internet Explorer, the system dynamically loads the necessary polyfill to enable the feature. This ensures that even legacy browsers can render modern web applications effectively, bridging the gap between new technologies and older environments.

Another key feature of the invention is responsive design testing, which ensures that the visual layout and user interface of web applications adapt seamlessly to different browser environments. Variations in browser rendering engines can cause inconsistencies in how websites are displayed, resulting in misaligned elements, broken layouts, or distorted content. The system dynamically analyzes the layout and appearance of web applications across different browsers and makes real-time adjustments to ensure consistency. For example, if a website designed for Chrome appears distorted in Firefox, the system automatically corrects the layout parameters to match the intended design. This feature enhances usability and ensures that users experience a visually consistent interface.

The invention also addresses JavaScript error debugging by dynamically analyzing and remediating client-side scripting errors that occur in specific browsers. JavaScript is widely used to enable interactive and dynamic web content, but certain functions or libraries may not be supported across all browsers. The system identifies JavaScript functions that fail to execute properly and replaces them with browser-compatible alternatives. For example, if a script that works perfectly in Chrome fails in Safari, the system generates an alternative script or modifies the existing code to achieve the same functionality. By automatically resolving JavaScript errors, the system ensures smooth execution of web applications in diverse environments.

To further enhance compatibility, the invention includes CSS normalization, which addresses variations in how stylesheets are interpreted by different browsers. Websites often rely on CSS to define visual styles, such as fonts, colors, and layouts, but these styles may render differently depending on the browser. The system analyzes the existing CSS and generates a generic, normalized stylesheet that ensures consistent visual rendering across all browsers. For example, if a style applied to a button appears differently in Internet Explorer than in Chrome, the system dynamically adjusts the CSS properties to achieve uniformity. This ensures that web applications deliver a consistent visual experience across platforms.

The invention incorporates accessibility testing, which ensures that required access settings for APIs, scripts, and components are compatible with specific browsers. Some browsers impose stricter access requirements or permissions for executing certain features, which can cause compatibility issues. The system identifies these access limitations and generates the necessary configuration settings to enable seamless execution. For instance, if an application requires access to certain browser components that are restricted by default, the system dynamically configures the access permissions to meet compatibility requirements. This feature improves reliability and reduces errors caused by access restrictions.

To optimize performance, the invention includes performance optimization algorithms that dynamically convert file formats and adjust API versions to improve efficiency across browsers. For example, images or videos that load efficiently in one browser may experience delays in another due to differences in format support. The system identifies these performance issues and converts files into formats that are optimized for the target browser. If a JPG image renders slowly in Internet Explorer, the system dynamically converts it to a format such as PNG to improve performance. Similarly, the system identifies optimal API versions for each browser and dynamically updates the configurations to ensure efficient execution.

The invention further addresses security policies by dynamically configuring browser settings to align with specific security requirements. Each browser implements its own security policies, which can sometimes interfere with the execution of web applications. The system analyzes these policies and adjusts the settings to ensure compatibility while maintaining security. For example, if a security policy in Firefox prevents the execution of a specific script, the system reconfigures the settings to allow the script to run safely without compromising security. This feature ensures that web applications remain both secure and functional.

The invention's ability to predict, analyze, and remediate compatibility challenges in real time allows it to provide a seamless user experience across diverse browsers and environments. By leveraging Generative AI, machine learning, and advanced algorithms, the system dynamically identifies and resolves incompatibilities, ensuring that web applications function reliably. It eliminates the need for manual intervention, reducing maintenance costs and improving operational efficiency for organizations deploying RBI environments.

The dynamic remediation approach provided by the invention supports both legacy and modern web applications, making it adaptable to organizations with diverse technological infrastructures. Its intelligent analysis and predictive capabilities ensure that compatibility issues are addressed proactively, preventing disruptions and reducing downtime. By optimizing browser configurations, dynamically adjusting scripts, and normalizing stylesheets, the invention delivers a consistent and seamless user experience across all platforms.

The long-felt and unmet need addressed by this invention arises from the growing complexity of web applications and the lack of automated solutions for resolving browser compatibility challenges. Existing methods rely on manual testing, patching, and reconfiguration efforts, which are inefficient and unsustainable. This invention fulfills that need by introducing an intelligent, automated, and proactive approach that ensures web applications remain functional, reliable, and efficient across all browsers and environments. By dynamically analyzing and remediating compatibility issues, the invention enables organizations to deliver seamless user experiences while maintaining the security and integrity of their web environments.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for securing remote browser isolation (RBI) environments to protect against web-based threats while ensuring efficient execution of web applications includes executing, by a sandboxing module within a remote browser isolation environment, a critical application or process in an isolated compartment, wherein the compartment prevents the application or process from interfering with or impacting other processes running within the system. The method further comprises allocating, by a process isolation algorithm implemented by a resource management component, dedicated system resources including CPU, memory, and network bandwidth to individual processes to ensure independent execution and prevent resource contention between processes. Additionally, the method includes restricting, by a resource limitation algorithm implemented by the resource management component, the consumption of system resources by each process, wherein the resources include CPU cycles, memory usage, and disk space, such that each process is dynamically allocated only the necessary resources for its execution. The method also prioritizes, by a network access control module, network resources to individual processes based on task sensitivity, wherein high-priority tasks are dynamically assigned dedicated network resources to ensure uninterrupted communication while lower-priority tasks share remaining bandwidth. Moreover, the method virtualizes, by a file system virtualization module, file system access for processes running within the remote browser isolation environment, wherein the virtualization module limits read and write access to only specific files required for a given process, preventing unauthorized access to other files or system resources. The method further analyzes, by a behavior monitoring module, real-time system activities within the remote browser isolation environment to identify unauthorized or suspicious behavior, wherein the module generates alerts for detected anomalies such as unauthorized file access, abnormal network activity, or malicious script execution. It also includes preapproval, by an application preapproval module, trusted applications or APIs that bypass the remote browser isolation environment, wherein the trusted applications or APIs are authenticated based on a pre-defined white-list, allowing them to execute directly without requiring additional verification or security checks. Additionally, the method involves detecting, by the behavior monitoring module, any attempt by an unauthorized or untrusted application to execute within the remote browser isolation environment, wherein such attempts are flagged, isolated, and prevented from further operation. The method dynamically reallocates, by the resource management component, system resources upon completion of a process, wherein resources are released and made available for subsequent processes to optimize overall system performance. Lastly, the method includes isolating, by the sandboxing module, any process exhibiting suspicious behavior as detected by the behavior monitoring module, wherein the process is quarantined to prevent propagation of malicious activity within the remote browser isolation environment.

In some arrangements, the method further includes isolating, by the sandboxing module, applications based on a predefined security policy, such that specific applications handling sensitive data are placed in sandboxed compartments with stricter execution controls, wherein the security policy defines isolation levels and execution parameters for applications based on their sensitivity.

In some arrangements, the method further comprises dynamically monitoring, by the resource management component, the resource usage of each process, wherein the resource management component reallocates additional CPU, memory, or disk space to processes based on changing process demands to ensure consistent performance and prevent resource starvation or bottlenecks.

In some arrangements, the method further determines, by the network access control module, network resource prioritization based on task classification, wherein the classification includes high-priority, medium-priority, and low-priority tasks, and wherein the sensitivity or criticality of the processes dictates the allocation of dedicated or shared network resources to ensure uninterrupted communication for critical tasks.

In some arrangements, the method further restricts, by the file system virtualization module, file access by assigning unique virtualized file system instances to each process, wherein each instance prevents processes from accessing shared or system-critical files, ensuring secure and isolated execution without unintended interference.

In some arrangements, the method further comprises analyzing, by the behavior monitoring module, system logs and historical activity patterns to identify recurring unauthorized behaviors or anomalies within the remote browser isolation environment, wherein the behavior monitoring module applies machine learning techniques to recognize patterns indicative of malicious activities.

In some arrangements, the method further allows, by the application preapproval module, bypass of trusted applications or APIs only after validating their integrity using cryptographic techniques such as checking digital signatures, certificates, or cryptographic hashes, ensuring that only authenticated and verified applications are permitted to bypass the remote browser isolation environment.

In some arrangements, the method further enforces, by the resource management component, resource usage thresholds for each process, wherein the resource management component dynamically monitors resource consumption, and upon detecting that a process exceeds its threshold, throttles the process to prevent degradation of overall system performance and resource exhaustion.

In some arrangements, the method further dynamically generates, by the behavior monitoring module, a report detailing all detected suspicious activities, flagged processes, and security alerts, wherein the report includes process-specific resource usage metrics, identified anomalies, system logs, and flagged behaviors for review and analysis by an administrative entity to enable remediation and security policy enhancements.

In some arrangements, the sandboxing module, upon quarantining a process flagged as malicious by the behavior monitoring module, further comprises identifying, by the behavior monitoring module, the specific activities, files, or network communications that triggered the flagging of the process as malicious. The sandboxing module then terminates the execution of the flagged process to prevent further operations or the propagation of potential threats within the remote browser isolation environment. Additionally, the sandboxing module isolates all related system resources, including allocated CPU, memory, and disk space, associated with the flagged process to ensure that no residual activity remains. The behavior monitoring module generates a detailed security incident report that includes the identified malicious behavior, affected system components, and associated resource usage for administrative analysis. The method further includes storing, by the file system virtualization module, a snapshot of the quarantined process's state, including file dependencies, logs, and execution data, to facilitate further forensic investigation and potential remediation steps.

In some arrangements, a system for securing remote browser isolation environments to protect against web-based threats while ensuring efficient execution of web applications comprises a sandboxing module configured to execute critical applications or processes in isolated compartments within a remote browser isolation environment. The sandboxing module prevents interference between processes and contains any malicious activity or failures within the isolated compartments. The system further includes a process isolation algorithm, implemented by a resource management component, that allocates dedicated system resources, including CPU, memory, and network bandwidth, to individual processes to ensure independent execution and prevent resource contention between tasks. A resource limitation algorithm, also implemented by the resource management component, restricts resource consumption for each process by dynamically assigning CPU cycles, memory usage, and disk space required for execution while preventing resource monopolization. A network access control module prioritizes network resources for individual processes based on task sensitivity, ensuring that high-priority processes are allocated dedicated network bandwidth for uninterrupted communication while lower-priority processes share remaining network resources.

The system includes a file system virtualization module configured to restrict file access for processes running in the remote browser isolation environment. The virtualization module assigns read and write permissions to only specific files required for a given process, preventing unauthorized or unintended access to other system-critical resources. A behavior monitoring module is configured to analyze real-time system activities, where the module identifies unauthorized or suspicious behavior, including abnormal file access, network activity, or execution patterns, and generates alerts for administrative review. Additionally, an application preapproval module is configured to allow trusted applications or APIs to bypass the remote browser isolation environment. Trusted applications are identified and verified using a pre-defined white-list, enabling direct execution without requiring additional authentication or security checks.

The system further incorporates a threat detection component, integrated with the behavior monitoring module, that isolates processes exhibiting suspicious or malicious activity. The threat detection component flags, terminates, and quarantines the identified processes to prevent the propagation of security threats within the system. A dynamic resource manager, implemented by the resource management component, reallocates system resources upon completion of individual processes, ensuring that released CPU, memory, or network bandwidth is reassigned to subsequent processes to optimize overall system performance. Lastly, the system comprises a security reporting module communicatively coupled with the behavior monitoring module. The security reporting module generates detailed incident reports for flagged or terminated processes, including information about identified malicious behavior, associated resource usage, activity logs, and other data to facilitate forensic analysis and administrative remediation.

In some arrangements, the system further includes a policy enforcement engine within the sandboxing module, wherein the policy enforcement engine determines isolation levels for processes based on predefined security policies. Sensitive processes, such as those handling confidential or mission-critical data, are assigned stricter isolation parameters to enhance their security and prevent unauthorized access or interference.

In some arrangements, the system further includes functionality within the process isolation algorithm to monitor the resource usage of each process in real time. The system dynamically reallocates additional CPU, memory, or disk space to processes experiencing increased resource demands, ensuring that performance remains consistent while preventing interruptions to other processes within the remote browser isolation environment.

In some arrangements, the system further includes network segmentation implemented by the network access control module. The module categorizes processes into priority levels, including high-priority, medium-priority, and low-priority, and restricts lower-priority processes to specific network segments. This segmentation minimizes latency, prevents resource congestion, and ensures that high-priority processes receive uninterrupted network communication for critical tasks.

In some arrangements, the system further includes the file system virtualization module generating unique virtualized file system instances for each isolated process. Each virtual file system instance ensures that file operations performed by one process are invisible and inaccessible to other processes within the remote browser isolation environment. This prevents unauthorized file access and protects system-critical data from being exposed or altered.

In some arrangements, the system further includes machine learning capabilities integrated within the behavior monitoring module. The module analyzes historical activity patterns to identify recurring behaviors or anomalies that may indicate potential threats. The machine learning algorithms continuously improve the accuracy of anomaly detection, allowing the system to recognize new attack vectors and suspicious activities over time.

In some arrangements, the system includes functionality within the application white-listing module to verify the integrity of trusted applications or APIs. The verification process involves validating cryptographic signatures, hashes, or digital certificates to ensure that only authenticated and unaltered applications are permitted to bypass the remote browser isolation environment.

In some arrangements, the system includes the threat detection component storing snapshots of the state of flagged processes. The snapshots include resource usage data, execution logs, file dependencies, and network activities at the time of isolation. These detailed snapshots facilitate forensic investigation, enabling administrators to analyze the behavior of flagged processes and take appropriate remediation actions to prevent similar threats in the future.

In some arrangements, the security reporting module further generates real-time alerts for flagged processes, the alerts including detailed information about the nature of the suspicious activity, such as the specific system files accessed, abnormal network communications attempted, or unauthorized execution patterns detected. The security reporting module transmits these alerts, along with comprehensive incident reports, to an administrative console, a security information and event management (SIEM) system, or a centralized threat management platform. The incident reports include a timestamped log of the flagged process's activities, resource consumption metrics, identified malicious behavior, and any associated virtual file system operations. The security reporting module further provides forensic snapshots of the quarantined processes' state, including execution data, file dependencies, network communication logs, and resource allocation details, to facilitate root cause analysis, threat intelligence gathering, and remediation efforts. The administrative console or SIEM system receives the alerts and incident reports in a format that supports automated correlation, analysis, and prioritization of security events. This integration enables security administrators to take immediate corrective actions, update security policies, and strengthen the system's defense mechanisms against recurring or emerging threats.

In some arrangements, a method for securing remote browser isolation environments to protect against web-based threats while dynamically remediating browser compatibility issues includes executing, by a sandboxing module within the remote browser isolation environment, critical applications or processes in isolated compartments, wherein the sandboxing module prevents interference between processes and contains potential malicious activity within the isolated compartments. The method further includes allocating, by a process isolation algorithm implemented by a resource management component, dedicated system resources including CPU, memory, and network bandwidth to individual processes to ensure independent execution and prevent resource contention among tasks. The method includes restricting, by a resource limitation algorithm implemented by the resource management component, system resource consumption for each process, wherein resources such as CPU cycles, memory, and disk space are dynamically assigned to processes to ensure optimized utilization and uninterrupted performance. The method further prioritizes, by a network access control module, network resources for individual processes based on task sensitivity, wherein high-priority tasks are allocated dedicated network bandwidth while lower-priority tasks share remaining network capacity.

The method also virtualizes, by a file system virtualization module, file system access for processes within the remote browser isolation environment, wherein the module restricts read and write permissions to only specific files required for task execution to prevent unauthorized access. The method analyzes, by a behavior monitoring module, real-time system activities to identify suspicious or unauthorized behaviors, wherein detected anomalies, such as abnormal network activities, unauthorized file access, or malicious scripts, are flagged, reported, and contained. The method further remediates, by a dynamic compatibility module, browser compatibility issues by conducting cross-browser testing, wherein the module tests the performance and functionality of web applications across different browsers and browser versions to detect discrepancies and incompatibilities.

The method includes identifying, by a feature detection module, unsupported browser features, APIs, or script versions used in a web application and dynamically generating alternative configurations or implementations that replicate the intended behavior of the unsupported features. Additionally, the method adjusts, by a CSS normalization module, the layout and style of a web application to ensure uniform rendering and visual consistency across multiple browsers, wherein the module dynamically generates a generic stylesheet compatible with the browsers in the remote browser isolation environment. The method further corrects, by a JavaScript error debugging module, client-side script errors by analyzing browser-specific execution requirements, dynamically replacing incompatible scripts with alternative implementations, and ensuring smooth execution of the web application in all browser environments.

The method integrates, by a polyfill implementation module, runtime scripts or APIs to enable modern web features in legacy browsers, wherein unsupported features are dynamically supplemented with equivalent implementations to ensure consistent functionality. The method also converts, by a performance optimization module, file formats and adjusts API versions to improve execution performance across diverse browsers, wherein media content or APIs incompatible with certain browsers are replaced or optimized for efficient operation. The method further monitors, by the dynamic compatibility module, real-time updates to web applications and analyzes historical and current compatibility data to predict emerging browser compatibility issues and proactively generate solutions to ensure seamless functionality.

The method white-lists, by an application white-listing module, trusted applications or APIs that bypass the remote browser isolation environment, wherein trusted applications are verified based on a pre-defined white-list and allowed to execute without additional authentication. The method further isolates and terminates, by the sandboxing module, any process exhibiting suspicious behavior as detected by the behavior monitoring module, wherein the flagged process is quarantined, its resource allocation is revoked, and a snapshot of its execution state is stored for forensic analysis. Finally, the method generates, by a security reporting module, detailed reports for detected compatibility issues and security anomalies, wherein the reports include identified discrepancies, flagged processes, resource usage metrics, activity logs, and snapshots for administrative review, further enabling forensic investigation and remediation actions.

In some arrangements, a method for dynamically remediating browser compatibility issues in remote browser isolation environments using generative AI and machine learning comprises analyzing, by a browser extension compatibility module, browser extensions within the remote browser isolation environment. The browser extension compatibility module identifies incompatible extensions by leveraging generative AI to analyze historical data, system configurations, and user preferences, and suggests alternative extensions or configurations to maintain consistent functionality. The method further includes filtering, by a feature detection module, web technologies and browser-specific features within a web application to identify unsupported functionalities, wherein the module dynamically adjusts rules to enable or replace incompatible features with alternative implementations that preserve application behavior. Additionally, the method includes performing, by a cross-browser testing module, automated testing of a web application across multiple browsers and browser versions within the remote browser isolation environment, wherein discrepancies in functionality, rendering, or performance are detected and analyzed for remediation.

The method further comprises detecting, by the feature detection module, unsupported APIs, JavaScript versions, or CSS attributes within the web application. The feature detection module dynamically generates alternative implementations to replicate the intended behavior of the unsupported features in the target browser environment. The method also includes correcting, by a JavaScript debugging module, client-side script errors caused by browser incompatibilities, wherein the module identifies problematic JavaScript code and dynamically replaces incompatible functions with alternative browser-specific implementations to ensure consistent execution. The method continues by normalizing, by a CSS normalization module, visual styles and layouts of the web application to ensure consistent rendering across different browsers. The CSS normalization module generates a standardized stylesheet that is dynamically adjusted for compatibility with the target browser environment.

The method further includes implementing, by a polyfill implementation module, runtime scripts to enable modern web features in legacy browsers. The polyfill implementation module supplements the target browser environment with equivalent polyfill implementations to replicate unsupported features, ensuring application functionality in older browser versions. The method also comprises converting, by a performance optimization module, media file formats and adjusting API versions within the web application to improve performance across browsers. The performance optimization module dynamically replaces or optimizes incompatible content formats or outdated APIs to enhance execution efficiency.

The method includes monitoring, by a compatibility monitoring module, real-time updates to the web application and analyzing historical and current behavior data to identify patterns that predict emerging compatibility issues. The compatibility monitoring module proactively generates remediation strategies for predicted issues. Additionally, the method comprises adjusting, by a responsive design testing module, the layout and screen rendering of the web application. The responsive design testing module dynamically adapts display parameters to ensure visual consistency and usability across different browser environments and devices.

The method further comprises identifying, by an accessibility testing module, access configuration requirements for browser components, APIs, or scripts. The accessibility testing module generates and applies the necessary settings to enable execution of the web application features within the target browser environment. The method also includes detecting, by the performance optimization module, latency or inefficiencies in loading media content. The module dynamically identifies alternative formats or rendering techniques to improve content delivery and execution speed across browsers.

The method further applies, by the compatibility monitoring module, real-time compatibility updates to adjust configurations and browser settings based on detected incompatibilities. The module ensures seamless execution of the web application as new updates or features are introduced. Finally, the method includes reporting, by a compatibility reporting module, identified compatibility issues and applied remediations. The compatibility reporting module generates detailed reports including discrepancies, feature adjustments, optimized implementations, and applied fixes for review by administrative users. The method concludes with dynamically updating, by the compatibility monitoring module, the system's compatibility database with real-time analysis data, wherein the updates include historical trends, predicted challenges, and newly applied solutions to improve the accuracy of future compatibility remediation processes.

In some arrangements, the method further comprises analyzing, by the browser extension compatibility module, browser extension metadata, including version numbers, permissions, and runtime dependencies, to identify potential conflicts within the remote browser isolation environment. The module performs in-depth analysis to ensure that all extension parameters are evaluated for compatibility.

In some arrangements, the method further comprises performing, by the feature detection module, real-time execution analysis of unsupported functionalities. The feature detection module dynamically applies alternative APIs or attributes by referencing a library of pre-validated compatibility solutions that are tailored to address specific requirements of the target browser environment.

In some arrangements, the method further comprises generating, by the cross-browser testing module, a browser compatibility matrix that identifies discrepancies in functionality, rendering, and performance across multiple browsers and browser versions. The matrix provides detailed insights for administrative review, categorizing compatibility issues by their severity, affected features, and browser-specific impacts. In some arrangements, the method further comprises monitoring, by the JavaScript debugging module, the execution flow of client-side scripts to identify runtime errors. The module dynamically patches the problematic script segments and ensures that the corrected script adheres to the target browser's execution requirements, preserving intended behavior and functionality.

In some arrangements, the method further comprises analyzing, by the CSS normalization module, browser-specific rendering engines. The module dynamically generates a unified and optimized CSS stylesheet that ensures consistent application appearance across different browsers, regardless of differences in layout calculations, style parsing, or rendering engines.

In some arrangements, the method further comprises dynamically loading, by the polyfill implementation module, only the required runtime libraries for specific features. The module minimizes overhead and ensures that modern web functionalities execute efficiently within older browser environments by selectively supplementing the browser with necessary polyfills.

In some arrangements, the method further comprises analyzing, by the performance optimization module, real-time resource consumption metrics, including bandwidth usage, CPU cycles, and memory allocation. The performance optimization module prioritizes content optimization tasks, such as format conversions or API adjustments, to improve browser execution efficiency and reduce latency.

In some arrangements, the method further comprises incorporating, by the compatibility monitoring module, machine learning algorithms to predict recurring compatibility challenges. The compatibility monitoring module analyzes historical behavior patterns and dynamically preemptively applies solutions to mitigate anticipated issues before they impact application performance or user experience.

In some arrangements, the method further comprises generating, by the compatibility reporting module, visual analytics dashboards that display comprehensive details of the compatibility remediation process. The dashboards include a categorized summary of browser compatibility issues, organized by feature type, browser version, severity level, and frequency of occurrence. The dashboards further provide a real-time status of applied remediations, including alternative API implementations, script replacements, polyfill integrations, and CSS adjustments, with corresponding timestamps and affected components. Detailed performance metrics, such as latency reduction, resource optimization, and execution time improvements achieved by the applied fixes, are also displayed. Historical trend analysis is included, showing recurring compatibility challenges and patterns, enabling system administrators to identify persistent issues and take preventive measures. The dashboards incorporate interactive graphs and visualizations that display compatibility results across multiple browsers, highlighting discrepancies in functionality, rendering, or performance for each browser version. The machine learning algorithms generate annotations and recommendations, providing actionable insights for administrators to refine browser configurations, prioritize critical compatibility fixes, or enhance web application design for improved multi-browser performance. The system further generates an exportable incident report containing structured data on compatibility fixes, affected browser environments, applied performance optimizations, and unresolved issues. This exportable report allows administrators to further analyze, audit, and integrate the insights into existing workflows or tools. The visual analytics dashboard is updated in real time as the compatibility monitoring module performs dynamic remediation, ensuring that administrators have immediate visibility into the current state of browser compatibility across all monitored environments.

In some arrangements, a system for dynamically remediating browser compatibility issues in remote browser isolation environments using generative AI and machine learning includes a browser extension compatibility module configured to analyze browser extensions within the remote browser isolation environment. The browser extension compatibility module identifies incompatible extensions by leveraging generative AI to evaluate extension metadata, runtime dependencies, and system configurations. The module further suggests alternative extensions or reconfigurations to ensure functional consistency and maintain uninterrupted application performance. The system also includes a feature detection module configured to identify unsupported APIs, JavaScript libraries, or CSS attributes in web applications within the remote browser isolation environment. The feature detection module dynamically generates alternative configurations, attributes, or API calls that replicate the intended functionality of the unsupported features across diverse browsers.

The system further comprises a cross-browser testing module configured to perform automated testing of web applications across multiple browsers and browser versions. The module detects discrepancies in rendering, functionality, or performance, generates a browser compatibility matrix, and applies targeted fixes to resolve the identified incompatibilities. The system includes a JavaScript debugging module configured to analyze and correct client-side script errors caused by browser-specific incompatibilities. The module dynamically replaces incompatible JavaScript code with browser-compatible alternatives to ensure smooth execution of web applications across multiple browser environments.

Additionally, the system includes a CSS normalization module configured to dynamically generate a unified and optimized stylesheet for web applications. The module ensures consistent rendering and visual layout across different browsers by analyzing browser-specific rendering engines and dynamically adjusting style parameters to achieve uniform appearance. The system further comprises a polyfill implementation module configured to integrate runtime scripts or libraries into legacy browsers. The polyfill implementation module supplements unsupported or missing features with polyfill implementations, enabling the execution of modern web functionalities within older browser environments.

The system also includes a performance optimization module configured to analyze resource consumption metrics, such as bandwidth, CPU usage, and memory usage, within the remote browser isolation environment. The performance optimization module dynamically converts media file formats, optimizes API versions, and adjusts rendering techniques to improve performance across browsers while minimizing latency. A compatibility monitoring module is configured to continuously monitor real-time updates to web applications and analyze historical and current compatibility data. The module predicts emerging browser compatibility issues using machine learning algorithms and generates proactive remediation strategies to ensure seamless application functionality.

The system further comprises a responsive design testing module configured to analyze and adjust the layout, screen rendering, and visual display parameters of web applications. The responsive design testing module ensures consistent usability and appearance across different browsers, devices, and screen sizes by dynamically adapting display settings to meet target environment requirements. An accessibility testing module is also included, configured to identify and configure browser-specific access settings for APIs, scripts, or web components. The accessibility testing module dynamically applies the required access permissions to enable execution of web application features within the target browser environment, ensuring compatibility and functionality.

The system includes a compatibility reporting module configured to generate detailed reports and visual analytics dashboards for detected compatibility issues, applied fixes, and performance optimizations. The module provides structured insights, including issue categorization, historical trend analysis, system resource impacts, and actionable recommendations for further refinement by system administrators. The system further comprises a real-time compatibility database communicatively coupled with the compatibility monitoring module. The real-time compatibility database stores and updates compatibility remediation data, including historical patterns, detected discrepancies, applied fixes, optimized configurations, and predicted issues. The stored data improves the accuracy of future compatibility solutions and ensures the system remains adaptable to evolving browser environments.

In some arrangements, the system further comprises a natural language processing (NLP) engine within the browser extension compatibility module. The NLP engine is configured to analyze user preferences and historical extension usage to provide personalized recommendations for alternative browser extensions. The recommendations ensure that the browser extensions maintain seamless functionality and user experience within the remote browser isolation environment while addressing compatibility challenges.

In some arrangements, the system further comprises utilizing, by the feature detection module, a machine learning model to analyze execution logs of web applications. The machine learning model predicts which unsupported APIs, JavaScript libraries, or CSS attributes are most likely to cause rendering or functional discrepancies. By leveraging predictive analysis, the feature detection module prioritizes the remediation of critical compatibility issues to ensure stable application performance within the remote browser isolation environment.

In some arrangements, the system further comprises generating, by the cross-browser testing module, a dynamic browser compatibility matrix. The compatibility matrix categorizes detected discrepancies based on browser version, severity, feature type, and runtime performance impacts. The matrix further prioritizes targeted fixes for high-impact issues, enabling administrators to address the most critical browser inconsistencies efficiently while maintaining application functionality across diverse environments.

In some arrangements, the system further comprises implementing, by the JavaScript debugging module, a prevalidated library of browser-specific JavaScript alternatives. The JavaScript debugging module dynamically selects and replaces problematic JavaScript code with optimized, browser-specific scripts. The dynamic selection ensures that client-side scripts execute correctly across multiple browsers without introducing additional errors or functional interruptions.

In some arrangements, the system further comprises analyzing, by the CSS normalization module, real-time visual rendering anomalies across browser environments. The CSS normalization module dynamically generates adaptive stylesheets that correct inconsistencies in layout or design. Each adaptive stylesheet maintains visual fidelity to the original design intent, ensuring consistent and uniform rendering of web applications across diverse browsers and screen sizes.

In some arrangements, the system further comprises selectively loading, by the polyfill implementation module, lightweight runtime scripts based on the target browser's feature set and version. The polyfill implementation module dynamically determines which runtime libraries are necessary to enable specific functionalities. By loading only the required polyfills, the module minimizes resource overhead while ensuring modern web features execute efficiently in legacy browser environments.

In some arrangements, the system further comprises identifying, by the performance optimization module, bottlenecks in media file rendering. The performance optimization module dynamically converts media files, such as images or videos, into optimized formats to improve execution performance. Examples include converting JPEG files to PNG, or MP4 video files to WebM, based on the browser's performance characteristics and supported file formats, thereby enhancing content delivery and reducing latency.

In some arrangements, the system further integrates, by the compatibility reporting module, with a centralized administrative console or external threat management system. The compatibility reporting module generates real-time visual analytics, remediation summaries, and predicted compatibility trends. The reports further include actionable recommendations, enabling administrators to prioritize and automate system optimizations. The integration enhances the management of browser compatibility remediation while providing comprehensive visibility into the compatibility status across monitored environments.

In some arrangements, a system for securing remote browser isolation environments to protect against web-based threats while dynamically remediating browser compatibility issues using generative AI and machine learning comprises multiple components operating in tandem to ensure secure, efficient, and consistent web application execution. The system includes a sandboxing module configured to execute critical applications and processes in isolated compartments within the remote browser isolation environment. The sandboxing module prevents interference between processes and contains any malicious activity or system failures to ensure secure execution. The system further includes a process isolation algorithm, implemented by a resource management component, that allocates dedicated system resources, including CPU, memory, and network bandwidth, to individual processes. This ensures independent execution and prevents resource contention among tasks within the RBI environment.

The system incorporates a resource limitation algorithm, implemented by the resource management component, to restrict and dynamically manage system resource consumption by processes. Resources such as CPU cycles, memory, and disk space are allocated based on process requirements, optimizing system performance and preventing resource monopolization. The system further comprises a network access control module configured to prioritize network resources for processes based on task sensitivity and priority. High-priority tasks are allocated dedicated network bandwidth, while lower-priority processes share remaining bandwidth, ensuring efficient communication.

The system includes a file system virtualization module configured to restrict file system access for processes operating within the RBI environment. The module assigns limited read and write permissions to specific files required for process execution, preventing unauthorized or accidental access to sensitive files. A behavior monitoring module analyzes real-time activities within the RBI environment, identifying unauthorized behaviors, abnormal network communications, or suspicious file access attempts. The behavior monitoring module flags detected behaviors for administrative review, generates security alerts, and takes corrective actions to isolate and terminate flagged processes.

A browser extension compatibility module analyzes browser extensions for compatibility within the RBI environment. The module identifies incompatible extensions using generative AI, evaluates runtime dependencies, and recommends alternative extensions or configurations to ensure functional consistency. A feature detection module identifies unsupported web technologies, APIs, or script functionalities in web applications and dynamically generates alternative configurations, APIs, or attribute calls to replicate the intended behavior across diverse browsers and browser versions.

The system also includes a cross-browser testing module configured to perform automated testing of web applications across multiple browsers and browser versions. The module detects rendering, functionality, or performance discrepancies, generates a dynamic compatibility matrix, and applies fixes to resolve detected inconsistencies. A JavaScript debugging module dynamically replaces incompatible client-side scripts with browser-specific, optimized alternatives to ensure smooth and error-free execution. A CSS normalization module generates unified and adaptive stylesheets to ensure consistent visual rendering of web applications across target browsers.

The polyfill implementation module supplements unsupported web features in legacy browsers by selectively loading runtime libraries tailored to the browser's feature set. The system further includes a performance optimization module that dynamically converts media file formats, adjusts API versions, and optimizes content delivery to improve application execution efficiency. A compatibility monitoring module continuously monitors real-time updates to web applications, analyzes historical and current data, and predicts emerging compatibility challenges using machine learning algorithms. Proactive solutions are generated to address predicted issues before they impact performance.

A responsive design testing module adapts the layout, rendering, and screen parameters of web applications to ensure consistent usability across browser environments, devices, and screen sizes. An accessibility testing module dynamically configures browser-specific access settings for APIs, scripts, and web components to enable seamless feature execution. A threat detection component integrated with the behavior monitoring module isolates processes exhibiting suspicious behavior, terminating, quarantining, and analyzing flagged processes for forensic purposes.

The system also includes a compatibility reporting module that generates remediation reports, visual analytics, and actionable recommendations. A real-time compatibility database stores and updates compatibility remediation data, including historical patterns, detected discrepancies, applied fixes, and emerging trends, improving future browser compatibility remediation and ensuring adaptability to evolving browser environments.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts a sample process flow for implementing a hybrid approach that combines remote browser isolation (RBI) with sandboxing, application white-listing, browser extension compatibility checks, and real-time compatibility updates using AI and machine learning. The figure outlines steps including sandboxing critical applications, white-listing trusted applications, integrating RBI for web browsing, utilizing browser emulation, and dynamically addressing compatibility issues through GEN-AI analysis and machine learning predictions.

FIG. 2 depicts a hybrid approach combining remote browser isolation (RBI) with sandboxing, application white-listing, and browser compatibility mechanisms to provide a comprehensive security and functionality strategy. The figure illustrates components such as sandboxing for isolating critical applications, white-listing trusted applications, browser emulation, feature filtering, and real-time compatibility updates using AI and machine learning.

FIG. 3 depicts a sample sequence diagram illustrating the interactions between system components, such as the sandboxing module, application white-listing module, resource management component, and behavior monitoring module, for executing, isolating, and monitoring processes within a secure remote browser isolation environment. The figure demonstrates the workflow for verifying white-listed applications, sandboxing untrusted processes, dynamically managing resources, detecting suspicious behavior, and updating security policies based on real-time analysis and monitoring.

FIG. 4 depicts a sample sequence diagram demonstrating the interactions between the browser compatibility monitoring module and various submodules, including the feature detection module, CSS normalization module, JavaScript debugging module, polyfill implementation module, and performance optimization module, to address browser compatibility issues in real time. The figure shows how each module performs specific tasks such as feature analysis, script debugging, stylesheet normalization, polyfill implementation, performance optimization, and reporting, ensuring seamless operation of web applications across diverse browser environments.

FIG. 5 depicts a class diagram outlining the architectural components of a hybrid security system designed to protect remote browser isolation environments. It illustrates the relationships and functionalities of the key modules, including the Hybrid Security Controller, Sandboxing Module, Application White-list Module, Resource Management Module, Behavior Monitoring Module, and Threat Detection Component, showcasing how they collaboratively manage process execution, resource allocation, threat isolation, and incident reporting.

FIG. 6 depicts a class diagram showcasing another aspect of the invention, detailing the components responsible for managing browser compatibility remediation, including the Browser Compatibility Controller, Feature Detection Module, JavaScript Debugging Module, CSS Normalization Module, Polyfill Implementation Module, Performance Optimization Module, and Compatibility Reporting Module. The figure illustrates the attributes and methods of each class, highlighting their roles in detecting, analyzing, correcting, and reporting browser compatibility issues through real-time updates, script replacement, feature gap analysis, media optimization, and validation processes.

DETAILED DESCRIPTION

One aspect of the invention provides a comprehensive hybrid security model for remote browser isolation environments, focusing on advanced mechanisms to protect against web-based threats while ensuring secure and efficient application execution. At its core, the system utilizes a sandboxing module that executes critical applications and processes in isolated compartments. These isolated compartments operate as secure environments, where each process runs independently and is strictly contained, preventing interference with other processes or the propagation of malicious activity. This architecture ensures that any compromise, whether caused by malware, unauthorized scripts, or system failures, remains contained within the sandboxed environment and does not affect other parts of the system. The sandboxing approach is reinforced by a process isolation algorithm implemented by a resource management component, which allocates dedicated resources such as CPU, memory, and network bandwidth to each process. This algorithm ensures that no process monopolizes shared resources, enabling independent execution without performance degradation caused by resource contention.

The invention introduces a resource limitation algorithm to complement the process isolation mechanism by restricting and dynamically managing resource consumption for each process. The resource limitation algorithm monitors system metrics, including CPU cycles, memory usage, and disk space allocation, to ensure that processes are allocated only the resources they require for execution. If a process attempts to consume more resources than its allocated limit, the algorithm enforces throttling, preventing the process from impacting the overall performance of the remote browser isolation environment. This dynamic approach optimizes resource utilization, maintaining a stable and efficient system even under high loads or during unexpected activity spikes. To address network communication, the invention incorporates a network access control module that prioritizes network bandwidth based on the sensitivity and criticality of individual tasks. High-priority processes, such as those involving secure financial transactions, are assigned dedicated network resources to guarantee seamless and uninterrupted communication. Lower-priority processes share remaining bandwidth, ensuring efficient utilization of network resources without compromising the performance of critical operations.

File system access is controlled through the file system virtualization module, which restricts read and write permissions for processes operating within the sandboxed environment. By virtualizing file system access, the module ensures that processes can only interact with specific files necessary for their execution, preventing unauthorized access to sensitive files or system-critical data. This granular level of control safeguards against data breaches, file corruption, or other malicious activities.

The invention also features a behavior monitoring module that continuously observes real-time activities within the remote browser isolation environment. The behavior monitoring module analyzes processes for suspicious or unauthorized behaviors, such as abnormal file access, irregular network communication, or the execution of malicious scripts. When anomalies are detected, the module generates alerts, flags the suspicious processes, and isolates them to prevent further propagation of threats. These alerts provide system administrators with immediate visibility into potential threats, enabling them to take appropriate corrective actions.

To streamline application execution, the invention includes an application white-listing module that allows trusted applications and APIs to bypass the sandboxed isolation layer. Applications are authenticated based on a pre-defined white-list and validated through mechanisms such as cryptographic signatures, hashes, or certificates. By allowing verified applications to execute directly, the system reduces overhead while maintaining strict security controls. If an unauthorized or untrusted application attempts to execute, it is flagged, isolated, and prevented from further operation. This dual approach balances efficiency and security by permitting trusted processes while containing potential threats. The invention also dynamically manages system resources throughout the process lifecycle. Once a process completes its execution, the resource management component reallocates released CPU, memory, and network bandwidth to subsequent processes, ensuring continuous optimization of resource utilization. In cases where a process is flagged as suspicious, the sandboxing module isolates and terminates the process, revokes its resource allocation, and captures a snapshot of the process's state. This snapshot includes execution logs, resource usage metrics, and file dependencies, enabling forensic analysis to identify the cause of the anomaly and inform future security enhancements.

Another aspect of the invention focuses on addressing browser compatibility issues in remote browser isolation environments using generative AI and machine learning. Web applications rely on diverse technologies such as APIs, JavaScript libraries, and CSS attributes, which often behave inconsistently across different browsers and browser versions. The invention provides a dynamic remediation system that ensures seamless functionality and performance of web applications regardless of the target browser environment. It begins with a browser extension compatibility module that analyzes browser extensions within the remote browser isolation environment. The module leverages generative AI to evaluate historical data, system configurations, and user preferences to identify incompatible extensions. Based on its analysis, the module recommends alternative extensions or configurations that replicate the intended functionality, ensuring a consistent user experience without disruptions caused by extension conflicts.

The feature detection module identifies unsupported web technologies, APIs, or browser-specific features that may cause functional discrepancies. By analyzing the underlying attributes of the web application, the module dynamically generates alternative configurations or implementations to replicate the behavior of unsupported features in the target browser environment. This process enables applications to perform reliably even when specific technologies are not natively supported. To ensure consistent rendering and functionality across browsers, the cross-browser testing module automates testing of web applications in multiple browsers and browser versions. The module detects discrepancies in rendering, layout, or performance and generates a browser compatibility matrix that categorizes identified issues based on severity, feature type, and runtime impact. High-impact issues are prioritized for resolution, ensuring that critical functionalities remain unaffected.

The JavaScript debugging module addresses browser-specific client-side script errors by dynamically identifying problematic JavaScript code and replacing incompatible functions with browser-optimized alternatives. This process ensures that web applications execute consistently across diverse browser environments without functional interruptions caused by script errors. The CSS normalization module analyzes browser rendering engines to generate unified and optimized stylesheets that correct visual inconsistencies. The module dynamically adapts stylesheets to align with the rendering parameters of the target browser, ensuring that web applications maintain a uniform layout and appearance across platforms. For legacy browsers that do not support modern web features, the polyfill implementation module selectively loads lightweight runtime scripts to replicate missing functionalities. By dynamically determining the required polyfills based on the browser's feature set and version, the module minimizes resource overhead while enabling seamless execution of modern web applications.

The performance optimization module enhances application performance by identifying and resolving resource bottlenecks. For example, the module converts media file formats such as JPEG to PNG or MP4 to WebM based on browser performance characteristics, ensuring faster content delivery and improved rendering efficiency. The module also adjusts API versions and optimizes content delivery techniques to reduce latency and improve overall execution speed. The compatibility monitoring module continuously monitors real-time updates to web applications and analyzes historical data to predict emerging compatibility challenges. Using machine learning algorithms, the module proactively generates solutions to address predicted issues before they impact application performance. This predictive approach ensures that web applications remain functional and optimized as new updates, features, or browser versions are introduced.

The responsive design testing module dynamically adjusts web application layouts, visual rendering parameters, and display settings to ensure usability across different devices, screen sizes, and browsers. By maintaining visual consistency and user experience, the module ensures that applications remain accessible and functional regardless of the target environment. The accessibility testing module identifies and applies required access configurations for browser components, scripts, and APIs, enabling the seamless execution of web application features. The system also incorporates a compatibility reporting module that generates detailed reports and visual analytics dashboards. These reports provide administrators with insights into detected compatibility issues, applied remediations, performance improvements, and historical trends. The reports include actionable recommendations for further refinements, enabling organizations to prioritize fixes and optimize configurations. Together, the various aspects of the inventions create a robust framework for securing and optimizing remote browser isolation environments. The first invention addresses system-level security challenges by isolating processes, managing resources, and containing potential threats. The second invention ensures that web applications remain compatible and performant across a range of browsers by dynamically remediating discrepancies using generative AI and machine learning. By integrating these two solutions, organizations can achieve enhanced security, operational efficiency, and application reliability in evolving technological environments. This combined approach not only mitigates security risks but also ensures that users experience consistent and seamless interactions with web applications across platforms.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 depicts an intricate and highly detailed process flow that demonstrates the implementation of a hybrid approach for securing remote browser isolation environments while simultaneously addressing browser compatibility issues through advanced mechanisms such as sandboxing, application white-listing, browser emulation, feature filtering, and real-time compatibility updates. The figure begins with step 100, where the hybrid approach integrates security protocols with compatibility remediation techniques into a single cohesive system. This integration ensures that web-based threats are isolated and mitigated while maintaining seamless functionality and performance of web applications across diverse browser environments. Each subsequent step builds upon this hybrid framework, combining security mechanisms with dynamic compatibility remediation using artificial intelligence and machine learning.

At step 102, the sandboxing process is initiated as a key component of the hybrid approach. The sandboxing module creates isolated compartments where critical applications and processes are executed in a secure environment. This isolation ensures that processes run independently of each other, preventing unauthorized interference or contamination of system resources. The sandbox provides strict containment, meaning any malicious or suspicious activity, such as unauthorized network access, abnormal resource usage, or malicious script execution, remains confined within the sandbox without propagating to other components of the system. To achieve this, the sandboxing module dynamically allocates system resources, including CPU cycles, memory, and network bandwidth, to each process, ensuring that operations remain stable and efficient. Processes are continuously monitored for anomalies, and if any suspicious behavior is detected, the sandboxing module terminates the flagged process, isolates all associated resources, and generates detailed execution snapshots. These snapshots include logs, execution history, and file dependencies, which can later be analyzed for forensic purposes.

Step 104 introduces application white-listing as a complementary layer to the sandboxing process. The application white-listing module ensures that only trusted applications or APIs are allowed to bypass the sandboxed remote browser isolation layer. Trusted applications are verified based on pre-defined white-lists and authenticated using cryptographic techniques such as digital signature verification, certificate validation, or hash-based integrity checks. By allowing verified applications to execute directly without additional layers of inspection, the system improves performance while maintaining strict security standards. If an application or process not on the white-list attempts execution, it is flagged, blocked, and isolated to prevent unauthorized access or interference. This step ensures that only trusted processes operate within the system while untrusted or unknown applications are contained and analyzed.

Step 106 depicts the integration of the remote browser isolation environment with the hybrid security model. Remote browser isolation adds an additional layer of protection by executing all browsing activities in an isolated environment separate from the user's local device. This architecture ensures that malicious websites, phishing attacks, and other web-based threats remain contained within the isolated browser session, protecting the user's system from potential harm. Any interaction between the isolated browser and the sandboxed processes is strictly monitored and controlled to prevent unauthorized access or data leaks. This integration ensures that web-based threats originating from external sources, such as malicious scripts or websites, are contained and mitigated within the RBI environment without affecting system performance or user workflows.

At step 108, the process flow highlights the use of browser emulation as part of the compatibility remediation mechanisms. Browser emulation allows the system to replicate the behavior and functionalities of multiple browsers and browser versions within the remote browser isolation environment. By emulating specific browser environments, the system can test and execute web applications in environments that differ from the original development environment. This emulation identifies compatibility issues, such as rendering inconsistencies, unsupported features, or functional errors, and enables the system to develop and apply targeted remediation strategies. The use of browser emulation ensures that web applications perform consistently across all browsers, minimizing disruptions caused by incompatibilities.

Step 110 introduces browser extension compatibility checks, where the browser extension compatibility module analyzes the compatibility of extensions operating within the remote browser isolation environment. This module leverages generative AI and machine learning algorithms to evaluate extension metadata, including version numbers, permissions, and runtime dependencies. Extensions identified as incompatible with the target browser environment are flagged, and alternative extensions or configurations are suggested to replicate the intended functionality. This approach ensures that browser extensions, which often enhance or modify web application behavior, do not disrupt the overall performance or security of the environment. By providing real-time extension analysis and recommendations, the system enables users to maintain a seamless and optimized browsing experience.

At step 112, feature filtering is performed by the feature detection module, which identifies unsupported web technologies, APIs, JavaScript libraries, or CSS attributes that may cause functional discrepancies in the target browser environment. The feature detection module dynamically analyzes the web application's components and filters out those features that are not natively supported. To address these discrepancies, the system generates alternative configurations, attributes, or script replacements that replicate the behavior of the unsupported features. This process leverages pre-validated libraries and machine learning models to ensure that the replacements align with the application's design intent. By dynamically filtering and replacing incompatible features, the system ensures that web applications remain functional and performant across all target browsers and browser versions.

Step 114 demonstrates the application of real-time compatibility updates to ensure the continued functionality of web applications as browser environments evolve. The compatibility monitoring module continuously monitors updates to web applications, browser features, and system configurations. By analyzing historical and real-time behavior data, the module predicts emerging compatibility issues using machine learning algorithms and generates proactive solutions to address them. These real-time updates dynamically adjust browser settings, configurations, and feature implementations to resolve newly identified issues before they impact performance. This continuous monitoring and updating process ensures that web applications remain fully functional and optimized even as browsers introduce new updates, features, or changes to their rendering engines.

The interconnected steps depicted in FIG. 1 highlight how the hybrid approach integrates multiple security and compatibility remediation mechanisms into a unified process flow. The sandboxing module and application white-listing steps establish strong security foundations by isolating processes, containing threats, and ensuring that only trusted applications operate within the environment. Integration with the remote browser isolation environment further enhances protection by containing web-based threats originating from external sources. The use of browser emulation, feature filtering, and extension compatibility checks ensures that web applications perform consistently across diverse browsers, identifying and remediating compatibility issues in real time. Real-time compatibility updates ensure that the system remains adaptive and responsive to evolving browser configurations and web application changes.

Together, these steps form a robust, scalable, and adaptive framework for securing remote browser isolation environments while addressing the challenges posed by browser incompatibility. The hybrid approach combines advanced security mechanisms with artificial intelligence and machine learning to deliver a solution that is capable of mitigating threats, optimizing system resources, and ensuring a consistent and seamless web application experience across all platforms and environments. FIG. 1 visually captures the dynamic interaction between these components, illustrating their collaborative operation and the comprehensive functionality of the system.

FIG. 2 presents a detailed depiction of a hybrid architecture that combines remote browser isolation environments with advanced security measures and dynamic browser compatibility solutions to deliver a comprehensive strategy for securing web applications and ensuring their seamless functionality across diverse environments. The figure begins with step 201, which focuses on implementing a hybrid approach by combining multiple layers of security, including remote browser isolation, sandboxing, and application white-listing. This architecture is designed to mitigate compatibility issues while maintaining strong protection against potential web-based threats. By integrating these components, the system allows trusted applications to bypass the RBI environment under specific conditions while continuing to isolate and contain untrusted or unknown applications, processes, and browsing activities. The hybrid approach ensures a balanced solution where critical security measures work in tandem with compatibility enhancements to optimize both performance and safety.

Step 201.1 of the figure introduces sandboxing as a core aspect of the hybrid approach. In this step, critical applications that require direct access to the local system or exhibit compatibility issues with the remote browser isolation environment are placed into isolated sandboxed environments. The sandbox serves as a secure containment zone where applications are executed independently of the rest of the system. This ensures that any potential threat, such as malicious behavior, abnormal resource consumption, or unauthorized file access, remains confined within the sandbox and cannot propagate to the broader network or operating system. By isolating these processes, the sandboxing module adds an additional layer of protection that prevents compromised or incompatible applications from affecting overall system stability or security. This is particularly useful for enterprise productivity tools or legacy applications that may not natively support modern isolation mechanisms but still require secure execution. The sandbox dynamically allocates resources such as CPU, memory, and disk space to ensure optimal performance while maintaining strict boundaries around each application.

Step 201.2 focuses on the use of application white-listing to allow trusted applications to bypass the remote browser isolation environment and run directly on the local system. The IT security team creates and maintains a white-list of verified applications, ensuring that only those that meet predefined security and integrity criteria are permitted to operate outside the RBI environment. These trusted applications may include enterprise productivity tools, business-critical software, or custom-built applications that require seamless performance and minimal latency. To verify trust, the system uses cryptographic checks such as digital signatures, hash validations, and certificate-based authentication, ensuring that only authorized software can bypass isolation. By enabling direct execution for white-listed applications, the system reduces compatibility issues while preserving the overall security posture. Unauthorized or unverified applications attempting to bypass the isolation layer are flagged, blocked, and isolated, maintaining strict control over what can execute on the system. This selective bypassing ensures that trusted applications function smoothly without introducing unnecessary risk.

In step 201.3, the architecture integrates remote browser isolation as the primary mechanism for securing web browsing activities. The RBI solution operates by executing all general web browsing activities in an isolated environment that is entirely separate from the user's local system. This separation ensures that malicious content, such as phishing attacks, drive-by downloads, or scripts embedded in untrusted websites, remains contained within the remote environment and cannot impact the user's device or network. By integrating RBI with sandboxing and application white-listing, the hybrid approach creates a comprehensive framework that balances compatibility and security. Applications that are sandboxed or white-listed can coexist seamlessly with the RBI environment, providing users with a streamlined experience while maintaining strong protections against external threats. This integration ensures that the system can address a wide variety of web-based risks while accommodating the specific needs of trusted applications.

Step 202 highlights the use of browser emulation as a technique for addressing compatibility issues within the remote browser isolation environment. The browser emulation mechanism replicates the behavior, features, and functionalities of specific browsers or browser versions, ensuring that web applications function correctly even when executed within the RBI environment. Many modern and legacy applications rely on browser-specific features, APIs, or rendering engines that may not be fully supported by the default configurations of an RBI solution. Through emulation, the system can create a virtualized browser environment tailored to the requirements of individual applications. This ensures that web applications render properly, execute intended functionality, and maintain compatibility across diverse browser environments without compromising security. Browser emulation also supports testing and validation, helping identify discrepancies in performance or behavior that require remediation.

Step 202.1 focuses on the analysis and compatibility management of browser extensions using a browser extension compatibility module. The module leverages generative artificial intelligence to analyze the functionalities, dependencies, and metadata of browser extensions operating within the RBI environment. Extensions are evaluated for compatibility based on factors such as version numbers, runtime permissions, and historical performance data. Machine learning algorithms are used to identify patterns in past compatibility issues, enabling the module to suggest alternative extensions or configurations that preserve functionality while mitigating conflicts. Additionally, natural language processing is applied to understand user preferences and usage patterns, allowing the system to generate personalized recommendations for compatible extensions. This ensures that users retain access to essential browser extensions without introducing performance or compatibility issues.

Step 202.2 details the feature filtering process, which involves analyzing web technologies and browser features in real time to determine their compatibility within the RBI environment. The feature detection module leverages artificial intelligence to monitor and identify features such as unsupported APIs, JavaScript libraries, or CSS attributes that may cause functional or rendering issues. Machine learning models dynamically adjust the filtering rules based on system performance, user feedback, and historical data. For example, features likely to cause compatibility conflicts are automatically filtered or replaced with alternative implementations that replicate their intended behavior. Generative AI enhances this process by predicting which web technologies or features are most prone to compatibility issues, enabling the system to proactively adjust filtering settings. This real-time adaptability ensures that web applications execute correctly within the RBI environment while maintaining optimal performance.

Step 202.3 introduces real-time compatibility updates as a mechanism for continuously adapting to changes in web applications, browser features, and user environments. The compatibility monitoring module continuously analyzes websites and applications for changes in compatibility requirements and updates the system configurations accordingly. Artificial intelligence algorithms analyze patterns in detected compatibility issues to predict future challenges and implement proactive solutions. For example, if a website introduces new features or technologies, the system can automatically update its compatibility database and adjust browser emulation, feature filtering, or extension settings to address potential conflicts. Machine learning models further detect emerging compatibility issues in real time and resolve them before they impact the user experience. These updates ensure that the remote browser isolation environment remains adaptable and resilient to evolving web standards and technologies, minimizing disruptions caused by compatibility issues.

FIG. 2 thus illustrates the seamless integration of security mechanisms and compatibility solutions, highlighting their interdependent roles in achieving a robust hybrid approach. The sandboxing module provides a secure execution environment for critical applications, isolating them from the broader system to prevent threats. Application white-listing ensures that trusted applications bypass the RBI environment while maintaining security through strict verification protocols. Browser emulation addresses compatibility challenges by replicating browser-specific behaviors, while feature filtering and real-time updates dynamically resolve emerging conflicts. Through the use of artificial intelligence, machine learning, and natural language processing, the architecture achieves an adaptive and scalable solution that balances security with usability. This comprehensive approach ensures that both web-based threats and compatibility issues are mitigated, allowing users to access applications and web resources securely and seamlessly across diverse environments.

FIG. 3 provides an expansive and intricate depiction of the sequence of interactions between the key components of the hybrid system designed to secure remote browser isolation environments, manage resource allocations dynamically, and identify suspicious behavior through continuous monitoring and analysis. The workflow begins when a user or system initiates a request to execute an application, which can include accessing a web-based process, running enterprise software, or launching any executable task within the remote browser isolation environment. This initial request is intercepted by the sandboxing module, shown as step 300, which functions as the central decision point. The sandboxing module evaluates the incoming process to determine the most appropriate execution path. This evaluation ensures that all processes, whether trusted or untrusted, undergo verification to prevent unauthorized or malicious code from being executed without sufficient scrutiny.

The sandboxing module, after identifying the incoming request, immediately communicates with the application white-listing module, labeled as step 302, to verify whether the application or process is trusted. The application white-listing module maintains a predefined white-list of authenticated applications and processes that have been validated through cryptographic techniques such as digital signature matching, hash-based integrity checks, or certificate validation. This module performs a comparison between the process and the entries in the white-list to determine if the application can bypass additional isolation layers. If the application is found on the white-list, the white-listing module sends a confirmation signal back to the sandboxing module, approving the process for direct execution on the local system. This bypass is intended to optimize performance for trusted enterprise software and known applications while still ensuring that such processes remain subject to background monitoring.

If the application or process is not listed on the white-list, the sandboxing module denies direct execution and proceeds to isolate the process within a sandbox environment. The sandbox environment functions as a secure execution container where the process can run independently without interacting with other processes or accessing critical system resources. To prepare for the sandboxing step, the sandboxing module requests dynamic resource allocation from the resource management component, labeled as step 304. The resource management component evaluates the system's current availability of resources, such as CPU cycles, memory, disk space, and network bandwidth, and assigns a portion of these resources to the sandboxed process. To avoid overutilization or contention, the resource management component dynamically monitors system usage to allocate resources efficiently. If necessary, it can throttle non-critical processes or reallocate unused resources from lower-priority tasks to ensure that the sandboxed process runs smoothly. This ensures optimal performance while maintaining the integrity of other concurrent operations within the system.

Once the sandbox environment is established and the allocated resources are validated, the sandboxing module initiates the execution of the process in the isolated environment. The behavior monitoring module, shown as step 306, immediately activates to begin continuous real-time analysis of the sandboxed process. The behavior monitoring module serves as the system's analytical engine, scrutinizing all operational parameters and activities of the process as it executes. This monitoring includes observing resource usage patterns, such as memory spikes or abnormal CPU consumption, as well as tracking file access attempts and network communications initiated by the process. The module compares these behaviors against established baselines and threat models to identify deviations or anomalies that could indicate suspicious or unauthorized activity. Examples of flagged behaviors include attempts to read or modify restricted files, the initiation of unexpected network requests to unapproved domains, or patterns of activity associated with known malware or malicious scripts.

If the behavior monitoring module detects any anomalies during the execution of the process, it immediately generates an alert signal and communicates the suspicious activity to the sandboxing module. Upon receiving the alert, the sandboxing module responds by isolating the flagged process further, revoking its allocated system resources, and terminating its execution to prevent potential damage or unauthorized propagation. To enable forensic analysis and ensure that administrators have sufficient information to respond to the incident, the sandboxing module captures a snapshot of the process state at the moment of termination. This snapshot includes critical details such as execution logs, file dependencies, network traffic history, and resource utilization metrics. The captured snapshot is forwarded to the behavior monitoring module, where it undergoes further analysis to determine the root cause of the detected anomaly. This forensic analysis helps identify whether the flagged activity was malicious, accidental, or caused by an unexpected application behavior.

Once the snapshot is analyzed, the behavior monitoring module generates a comprehensive security incident report that documents the detected anomaly, the process's execution history, the system components affected, and any potential security risks identified. This report is sent to the administrative console, where it can be reviewed by system administrators for further action. The administrative console functions as the centralized interface for security management and reporting, allowing administrators to analyze flagged processes, update white-listing policies, and refine system behavior models to improve future detection accuracy. The incident report also enables the identification of patterns or trends, such as recurring threats or frequent anomalies originating from specific applications or sources. This iterative analysis helps administrators strengthen system defenses and prevent similar issues in the future.

For sandboxed processes that execute without exhibiting suspicious activity, the sandboxing module signals the resource management component to release the allocated system resources. These resources, which include CPU cycles, memory, and bandwidth, are returned to the resource pool and dynamically reallocated to support other active processes or tasks. The resource management component optimizes system efficiency by ensuring that unused resources are continuously reassigned based on current demand. This dynamic resource reallocation prevents bottlenecks and ensures that the system operates smoothly, even during high-load conditions.

For processes that were initially white-listed and executed directly without entering the sandbox environment, the behavior monitoring module remains active throughout their lifecycle. This ensures that even trusted applications are continuously monitored for unexpected or suspicious behavior. If any deviations are detected during execution, the behavior monitoring module flags the process and generates an alert for administrators to review. This additional monitoring layer ensures that no trusted application can inadvertently compromise the system or introduce risks.

At the conclusion of the process lifecycle, all activity logs, resource usage metrics, behavior analysis data, and incident reports are stored for audit purposes. These logs are invaluable for post-incident analysis, enabling administrators to identify long-term trends, assess system performance, and refine security policies. The sandboxing module, resource management component, and behavior monitoring module collaborate seamlessly to ensure that processes are executed securely, system resources are managed efficiently, and threats are isolated effectively.

FIG. 3 thus provides an extensive view of how the hybrid system operates to balance security and performance within remote browser isolation environments. The system's layered approach combines sandboxing for isolating untrusted processes, white-listing for optimizing trusted application execution, resource management for dynamic allocation and reallocation, and behavior monitoring for detecting and responding to anomalies in real time. This comprehensive framework ensures that processes run securely without compromising system performance or usability, while the continuous monitoring and reporting mechanisms provide robust defenses against both known and emerging threats. The figure captures the intricate interactions and coordinated workflows between system components, demonstrating the system's ability to adapt dynamically to varying execution demands and security challenges.

FIG. 4 provides a detailed and expanded depiction of a sequence diagram that illustrates the dynamic interactions between critical components within the system designed to remediate browser compatibility issues in a remote browser isolation environment. The figure portrays a comprehensive flow of operations, starting from the initial detection of browser incompatibilities to the final resolution of these issues through a series of collaborative steps performed by various modules. Each component, including the browser compatibility monitoring module, feature detection module, JavaScript debugging module, CSS normalization module, polyfill implementation module, and performance optimization module, works in coordination to ensure that web applications execute seamlessly, efficiently, and consistently across multiple browsers and browser versions. The sequence diagram outlines the system's ability to identify unsupported features, resolve client-side script errors, adjust rendering inconsistencies, supplement missing functionalities, and optimize performance, all while maintaining system responsiveness and user experience.

The process begins at step 400 when the browser compatibility monitoring module intercepts a request to load a web application within the remote browser isolation environment. The browser compatibility monitoring module serves as the orchestrator and central controller for identifying, analyzing, and resolving compatibility issues. At this stage, it assesses the current browser configuration, including the browser version, supported features, and active runtime settings. This initial assessment enables the monitoring module to determine whether the web application's components align with the browser environment's capabilities or if incompatibilities are likely to occur. The module then initiates a systematic analysis to detect and address any discrepancies before they disrupt the web application's functionality.

At step 402, the browser compatibility monitoring module engages the feature detection module to analyze the web application's underlying components and identify technologies that may not be compatible with the browser environment. The feature detection module scans the application's structure, including its HTML content, CSS attributes, JavaScript libraries, and external API calls, to identify unsupported, outdated, or deprecated features. For instance, it may detect JavaScript functions relying on modern standards not supported by older browser versions or CSS attributes causing inconsistencies in rendering due to variations in browser engines. The feature detection module references an extensive compatibility database that includes historical data on known incompatibilities, browser-specific behaviors, and validated solutions. Using machine learning algorithms, it prioritizes identified features based on their severity and impact, ensuring that the most critical issues, such as those affecting core functionality or user interaction, are addressed first. The results of this analysis are compiled into a feature compatibility report, which serves as a roadmap for subsequent remediation steps.

Following the identification of problematic features, the browser compatibility monitoring module invokes the JavaScript debugging module at step 404 to address errors or incompatibilities detected within the application's client-side scripts. The JavaScript debugging module dynamically inspects the application's JavaScript code to identify runtime errors, unsupported functions, syntax inconsistencies, or browser-specific behaviors causing execution failures. These issues may arise from the use of modern JavaScript features unsupported in older browsers or conflicts caused by variations in JavaScript execution engines. To resolve these issues, the JavaScript debugging module uses generative AI to generate compatible alternatives optimized for the target browser. It dynamically replaces incompatible functions or script segments with validated equivalents, ensuring that the application's execution flow remains intact. For instance, if certain JavaScript promises or asynchronous calls fail in a legacy browser, the module generates synchronous alternatives or uses polyfill libraries to replicate the desired behavior. The JavaScript debugging module further validates the corrected scripts by simulating execution scenarios to confirm that the changes restore functionality without introducing new errors.

At step 406, the browser compatibility monitoring module engages the CSS normalization module to resolve visual inconsistencies caused by variations in browser rendering engines. Rendering discrepancies can include misaligned user interface components, improper font rendering, incorrect spacing, or overlapping elements. These inconsistencies often stem from CSS attributes or layout rules that behave differently across browsers. The CSS normalization module dynamically analyzes the application's stylesheets and identifies problematic attributes that require adjustment. It generates an optimized, standardized stylesheet tailored to the specific rendering capabilities of the target browser environment. For example, if a browser does not support flexbox or grid-based layouts, the module dynamically generates alternative styling solutions to replicate the original design intent. By correcting these discrepancies, the CSS normalization module ensures that the visual layout remains consistent, maintaining uniformity in spacing, alignment, colors, and fonts across different browser versions and environments. The updated stylesheets are validated to confirm that they achieve the desired rendering consistency while preserving the application's aesthetic quality.

At step 408, the browser compatibility monitoring module activates the polyfill implementation module to address functionality gaps caused by missing features or APIs in legacy browsers. Modern web applications often rely on advanced features such as fetch APIs, promises, or async/await constructs that older browsers may not support natively. The polyfill implementation module dynamically identifies these gaps and loads lightweight polyfill libraries that replicate the behavior of the missing features. By supplementing browser environments with runtime polyfills, the module ensures that modern functionalities continue to operate seamlessly even in legacy environments. For instance, unsupported JavaScript features are dynamically replaced with polyfill implementations that provide equivalent functionality without altering the application's behavior. The polyfill implementation module optimizes the loading process to ensure that only necessary libraries are applied, minimizing overhead and resource consumption. This targeted approach preserves backward compatibility while maintaining performance efficiency.

At step 410, the browser compatibility monitoring module invokes the performance optimization module to address performance inefficiencies and improve the application's execution speed. The performance optimization module analyzes content such as media files, external API calls, and network requests to identify bottlenecks impacting load times and responsiveness. Large media files, such as high-resolution images or videos, are dynamically converted to optimized formats that reduce their size while maintaining quality. For example, JPEG images may be converted to WebP or PNG formats, and video files may be transcoded to WebM to ensure faster rendering and playback. Additionally, outdated or inefficient API calls are replaced with optimized versions that consume fewer resources and reduce latency. The performance optimization module validates the changes by measuring the application's load times, resource utilization, and responsiveness, ensuring that performance benchmarks are achieved.

As the sequence progresses, the browser compatibility monitoring module consolidates all updates and fixes applied to the web application. These include JavaScript script corrections, CSS stylesheet adjustments, polyfill integrations, and performance optimizations. The consolidated updates are applied dynamically, ensuring that the application's compatibility issues are resolved in real time without requiring manual intervention. The system generates a detailed compatibility remediation report that summarizes the identified issues, applied fixes, and resulting performance improvements. This report includes metrics such as error resolution rates, visual consistency scores, resource savings, and optimization outcomes, providing administrators with clear insights into the system's remediation process. The sequence depicted in FIG. 4 highlights the dynamic and adaptive interactions between the browser compatibility monitoring module and its associated submodules. Each component performs specific tasks, such as detecting compatibility issues, analyzing problematic features, debugging client-side scripts, resolving visual discrepancies, supplementing missing functionalities, and optimizing performance, to ensure seamless execution of web applications across diverse browser environments. By leveraging generative AI, machine learning, and real-time monitoring, the system addresses compatibility challenges dynamically and proactively, ensuring that users experience consistent functionality, visual uniformity, and efficient performance regardless of browser type or version. FIG. 4 illustrates how these processes are executed seamlessly and collaboratively, underscoring the system's ability to maintain web application reliability, responsiveness, and adaptability in remote browser isolation environments.

FIG. 5 presents an extensive and highly detailed class diagram that meticulously illustrates the intricate architecture and interrelationships between key components within the hybrid security system for remote browser isolation environments. Each class in the figure represents a critical element of the system that contributes to safeguarding the remote browser isolation environment while ensuring seamless compatibility, efficient resource utilization, and advanced threat detection. The figure highlights how components such as the Hybrid Security Controller, Sandboxing Module, Application White-listing Module, Resource Management Module, Behavior Monitoring Module, Threat Detection Component, and Incident Reporting Module are interconnected and operate in a coordinated manner to deliver a robust and adaptive security solution.

At the center of the architecture, the Hybrid Security Controller serves as the principal orchestrator that governs and manages the interactions between all system components. This controller receives execution requests for applications and processes that enter the remote browser isolation environment, analyzes these requests, and determines the appropriate path for execution based on security policies and trust levels. The Hybrid Security Controller first decides whether a process should be executed within a sandboxed environment or allowed to bypass the sandbox through white-listing verification. For untrusted or unidentified applications, the Hybrid Security Controller invokes the Sandboxing Module to create a secure and isolated execution environment where the process can operate without posing risks to other components or the broader system. Conversely, for applications identified as trusted, the Hybrid Security Controller interfaces with the Application White-listing Module to verify their authenticity, allowing them to execute directly while bypassing the sandbox. This dual-path execution approach ensures that trusted applications can operate efficiently while untrusted or unknown processes remain contained and secure.

The Sandboxing Module plays a critical role in ensuring process isolation for applications that fail to meet white-listing criteria. When triggered by the Hybrid Security Controller, the Sandboxing Module dynamically creates a secure execution environment that prevents untrusted processes from accessing shared system resources, files, or network components. The sandbox ensures that any malicious activity or unintended failures remain contained within a controlled environment, mitigating the risk of propagating threats to other processes. The Sandboxing Module also interfaces with the Resource Management Module to allocate necessary system resources, such as CPU cycles, memory, and bandwidth, to ensure that the sandboxed process operates smoothly. These resources are allocated dynamically based on the process's requirements and are monitored in real time to prevent overutilization or bottlenecks. By securely isolating processes, the Sandboxing Module adds a vital layer of protection that ensures the integrity and security of the remote browser isolation environment.

The Application White-listing Module supports the system by managing a predefined list of trusted applications verified through cryptographic methods such as digital signature matching, certificate validation, and hash-based integrity checks. When the Hybrid Security Controller receives a request for execution, the Application White-listing Module verifies whether the process exists on the white-list. If the application is verified as trusted, it is allowed to bypass the sandbox and execute directly on the system, improving performance by eliminating the overhead of sandbox isolation. Trusted applications are still subject to continuous monitoring by the Behavior Monitoring Module to detect any unexpected deviations from normal behavior. The Application White-listing Module ensures that only authenticated processes gain direct access, balancing security and performance to create a seamless user experience.

The Resource Management Module, which is tightly integrated with the Hybrid Security Controller, Sandboxing Module, and Behavior Monitoring Module, dynamically allocates, monitors, and reallocates system resources to optimize performance. For sandboxed processes, the Resource Management Module assigns specific CPU, memory, and bandwidth resources based on the application's requirements. The module continuously monitors resource usage to prevent resource contention and overutilization. If resource demands change during execution, the Resource Management Module dynamically throttles lower-priority processes or reallocates unused resources to ensure efficient performance. Once the sandboxed process completes its execution, the Resource Management Module releases the allocated resources and makes them available for other tasks. This dynamic resource management ensures optimal system performance while supporting the execution of multiple processes in parallel.

The Behavior Monitoring Module is one of the most critical components in the architecture, responsible for continuous monitoring and analysis of process behavior in real time. Whether processes are sandboxed or white-listed, the Behavior Monitoring Module observes their activities, including file access attempts, memory usage patterns, network communication requests, and execution flow. The module employs advanced machine learning algorithms and anomaly detection techniques to identify deviations from expected behaviors. Suspicious activities, such as attempts to access restricted files, abnormal spikes in resource consumption, or unauthorized network communications, are flagged as potential threats. When anomalies are detected, the Behavior Monitoring Module sends alerts to the Threat Detection Component and logs detailed information about the flagged process for forensic analysis. This continuous monitoring ensures that even trusted applications, which bypass sandboxing, are subject to rigorous scrutiny, minimizing the risk of malicious behavior going undetected.

The Threat Detection Component works in conjunction with the Behavior Monitoring Module to evaluate flagged processes and determine the severity of the detected threat. When the Behavior Monitoring Module identifies anomalies, the Threat Detection Component analyzes the behavior patterns and historical data to assess the nature of the threat. If the process exhibits indicators of malware, unauthorized scripts, or other malicious activity, the Threat Detection Component isolates the process further by revoking its resource allocations, terminating its execution, or quarantining it for analysis. This immediate corrective action prevents the threat from propagating within the system or affecting other processes. The Threat Detection Component also communicates findings to the Incident Reporting Module, ensuring that administrators receive comprehensive insights into the nature of the threat, the affected components, and recommendations for further action.

The Incident Reporting Module generates detailed reports based on data collected from the Threat Detection Component, Behavior Monitoring Module, and other parts of the system. These reports include comprehensive logs of process activities, flagged anomalies, resource usage metrics, and details of applied remediation steps. The Incident Reporting Module compiles these insights into actionable reports that provide system administrators with the information needed to investigate incidents, refine security policies, and improve the overall resilience of the system. The reports can be exported to external platforms such as security information and event management (SIEM) systems, enabling further analysis, automated threat correlation, and proactive policy adjustments. By providing administrators with a detailed view of security incidents, the Incident Reporting Module ensures transparency and enables effective decision-making to strengthen system defenses.

FIG. 5 thus shows the cohesive interoperation of all the components within the hybrid security architecture, demonstrating how the system manages process execution, resource allocation, behavior analysis, threat detection, and incident reporting in a remote browser isolation environment. The Hybrid Security Controller serves as the central hub that coordinates the execution paths of processes, while the Sandboxing Module ensures that untrusted processes remain isolated. The Application White-listing Module allows trusted applications to bypass the sandbox without compromising security, and the Resource Management Module optimizes the allocation and utilization of system resources. The Behavior Monitoring Module provides continuous scrutiny of all processes, and the Threat Detection Component responds to detected anomalies by isolating threats. The Incident Reporting Module completes the workflow by providing administrators with actionable intelligence to further secure the system. This architecture delivers a robust, adaptive, and comprehensive security solution that balances isolation, compatibility, resource efficiency, and threat detection, ensuring that the remote browser isolation environment remains secure, efficient, and resilient against web-based threats.

FIG. 6 provides a highly detailed and comprehensive class diagram that illustrates the architecture and intricate interactions of the core components responsible for managing and remediating browser compatibility issues in remote browser isolation environments. This class diagram represents the structural layout of the system, defining the attributes, functionalities, and relationships between the individual components that collectively work to detect, analyze, and resolve compatibility challenges dynamically and in real time. The system is structured to ensure that web applications operate seamlessly across multiple browsers, browser versions, and rendering engines by addressing inconsistencies, errors, and missing functionalities while maintaining high performance and usability. Each component shown in FIG. 6 is designed to fulfill a specialized role, and the relationships between these components demonstrate the cohesive and interconnected nature of the system architecture.

At the center of the diagram, the Browser Compatibility Controller (600) serves as the primary orchestrator that coordinates and governs all operations related to identifying and resolving compatibility issues. It acts as the main decision engine, overseeing the interactions and workflows across all other modules to ensure that issues are detected, analyzed, and remediated in a systematic and efficient manner. The Browser Compatibility Controller is equipped with attributes that include information about browser configurations, execution policies, runtime compatibility libraries, feature mappings, and optimization thresholds. The controller receives requests to load web applications within the remote browser isolation environment and determines the compatibility requirements based on the current browser environment. It dynamically initiates actions such as feature detection, script debugging, stylesheet normalization, polyfill integration, and performance optimization. Each of these operations is delegated to the appropriate module to ensure that specific tasks are addressed with precision and that any incompatibilities are quickly remediated. The controller continuously monitors the progress of remediation tasks and validates the results to ensure that all identified issues are resolved before presenting the application to the end user. It serves as the critical bridge between detection and resolution, ensuring that workflows remain synchronized and adaptive to varying browser conditions.

The Feature Detection Module (602) plays a vital role in the initial stages of the remediation process by systematically scanning and analyzing the web application to identify unsupported or problematic components. This module operates with attributes such as compatibility libraries, browser-specific feature mappings, real-time execution logs, and criticality scores that prioritize issues based on their impact on the application. The module's functionality includes the ability to identify modern features such as advanced JavaScript functions, HTML5 elements, CSS animations, or APIs that are not supported in certain browsers. It compares the detected features against an extensive compatibility database to determine which components may cause rendering failures, script errors, or functionality gaps. For example, the module may flag JavaScript libraries relying on ES6 features like 'async/await' or 'arrow functions' that are incompatible with legacy browsers. Similarly, it identifies CSS attributes, such as grid layouts or flexbox rules, that behave inconsistently across different rendering engines. Once this analysis is complete, the module generates a detailed feature compatibility report that highlights detected issues and categorizes them by severity. This report is shared with the Browser Compatibility Controller, which uses it as the basis for triggering specific remediation workflows.

The JavaScript Debugging Module (604) is designed to address client-side script errors and execution failures caused by browser-specific incompatibilities. The module operates with attributes such as a repository of pre-validated JavaScript solutions, runtime execution logs, and feature replacement rules. When triggered by the Browser Compatibility Controller, the JavaScript Debugging Module performs a deep inspection of the web application's scripts to identify problematic code segments, unsupported syntaxes, and conflicting execution flows. For instance, if a modern browser supports 'fetch' API calls or 'Promise' objects while a legacy browser does not, the module dynamically generates equivalent replacements that replicate the same behavior. The generative AI capabilities of the module enable it to produce optimized code alternatives tailored to the execution environment of the target browser. These dynamically generated solutions are validated by simulating script execution to ensure that the changes preserve the application's intended functionality without introducing new errors. The module also logs corrected code segments, enabling administrators to track applied changes and assess their impact on overall compatibility.

The CSS Normalization Module (606) focuses on resolving rendering inconsistencies and layout issues caused by differences in browser-specific rendering engines. It operates with attributes such as a repository of adaptive stylesheets, browser rendering models, and real-time visual validation tools. When invoked, the CSS Normalization Module analyzes the web application's existing stylesheets and identifies attributes or rules that do not behave consistently across browsers. For example, discrepancies may arise due to differences in how browsers interpret CSS properties such as 'flexbox', 'grid', or 'transform'. The module dynamically generates optimized and adaptive stylesheets tailored to the target browser, ensuring that all visual elements, including spacing, alignment, fonts, colors, and animations, are rendered uniformly. By replacing problematic CSS rules with browser-specific alternatives, the module eliminates visual anomalies such as overlapping content, misaligned user interface components, or improper scaling. Once the updated stylesheets are applied, the module validates the results by rendering the application's layout and comparing it against the intended design, ensuring that the visual consistency is preserved across different browsers.

The Polyfill Implementation Module (608) addresses functional gaps caused by unsupported or missing features in legacy browsers. The module operates with attributes such as a polyfill library repository, browser capability mappings, and dynamic loading mechanisms. When the Feature Detection Module identifies missing features such as advanced APIs, DOM manipulation methods, or JavaScript constructs, the Polyfill Implementation Module dynamically integrates lightweight polyfill libraries that replicate the behavior of these features. For instance, modern functionalities such as 'async/await', 'Promise', or 'fetch' API can be supplemented with equivalent polyfill implementations to ensure seamless execution. The module optimizes polyfill integration by loading only the necessary libraries based on the specific requirements of the target browser. This targeted approach minimizes overhead, reduces resource consumption, and ensures that legacy browsers can execute modern web applications without functional degradation.

The Performance Optimization Module (610) enhances the efficiency and responsiveness of web applications by identifying and resolving performance bottlenecks. The module operates with attributes such as a resource usage tracker, file format conversion tools, and execution performance metrics. It analyzes the application's content, such as media files, API calls, and rendering workflows, to identify areas where optimization is needed. For example, large media files like images or videos are dynamically converted to optimized formats such as WebP or WebM to improve loading speeds. Inefficient API calls or outdated network protocols are replaced with streamlined alternatives that reduce latency and improve execution performance. The module validates these optimizations to ensure that the application delivers improved responsiveness, reduced resource consumption, and enhanced user experience.

The Compatibility Reporting Module (612) generates comprehensive reports that document the remediation process, including identified compatibility issues, applied fixes, performance optimizations, and validation results. The module provides detailed insights into the system's operations, enabling administrators to review the steps taken to address browser compatibility challenges. These reports include metrics such as error resolution rates, visual consistency scores, and performance improvements, providing actionable intelligence to refine compatibility management policies.

FIG. 6 thus highlights the interrelationships and functionalities of these components, showcasing how they work together to identify, analyze, and resolve browser compatibility issues dynamically. The Browser Compatibility Controller coordinates these workflows, while the Feature Detection Module, JavaScript Debugging Module, CSS Normalization Module, Polyfill Implementation Module, Performance Optimization Module, and Compatibility Reporting Module perform specialized tasks to ensure seamless application execution across diverse browser environments. The system delivers a robust and adaptive solution that enhances compatibility, optimizes performance, and ensures a consistent user experience.

Pseudocode exemplars for implementing various aspects of this disclosure are set forth below with explanations for reference.

Below is a detailed pseudocode implementation for each core aspect of the first and second inventions. The pseudocode outlines how the system can function and interact to achieve the hybrid security model and dynamic browser compatibility remediation. After each segment of pseudocode, a detailed explanation is provided.

Sandboxing Module Implementation

```
function ExecuteInSandbox(application):
  initialize sandbox = createIsolatedEnvironment( )
  assign resources (CPU, Memory, Network) to sandbox
  try:
    execute application within sandbox
    if application_behavior == "malicious":
      log "Suspicious behavior detected"
      terminate application
      isolate sandbox_resources
      save_snapshot(application)
      alert administrator
    else:
      release sandbox_resources
  except Execution Error:
    log "Application execution failed"
    isolate sandbox_resources
    save_snapshot(application)
    alert administrator
  finally:
    destroy sandbox
```

The pseudocode above details the sandboxing module responsible for executing processes or applications in isolated environments. The function begins by creating a sandboxed environment and assigning the necessary resources, including CPU, memory, and network bandwidth, to ensure smooth operation. The application executes within the sandbox under continuous monitoring. If suspicious behavior such as unauthorized file access or abnormal network communication is detected, the behavior is flagged, the application is terminated, and the associated resources are isolated to prevent further impact. A snapshot of the application state, including logs, file dependencies, and execution metrics, is saved for forensic analysis. Finally, alerts are sent to administrators for review. If no errors occur, resources are released and the sandbox is destroyed.

Process Isolation and Resource Management

```
function AllocateResources(process):
  resources = monitorSystemResources( )
  if resources.available >= process.required_resources:
    assign process.required_resources
  else:
    log "Resource allocation failed - insufficient resources"
    throttle process
    reallocate unused resources
function DynamicReallocateResources( ):
  while True:
    for process in running_processes:
      monitor process.resource_usage
      if process.resource_usage > threshold:
        throttle process
        log "Process throttled due to overutilization"
      else if process.completed:
        release process.resources
        reallocate process.resources
```

The resource management pseudocode ensures that processes are allocated sufficient resources while preventing resource monopolization. The 'AllocateResources' function verifies that the required CPU, memory, and network bandwidth are available before assigning them to a process. If resources are insufficient, the process is throttled to avoid overconsumption. The 'DynamicReallocateResources' function continuously monitors all active processes and their resource usage. If a process exceeds the defined thresholds, it is throttled to prevent performance degradation. Completed processes release their resources, which are dynamically reallocated to new or ongoing tasks, ensuring optimal resource utilization and system performance.

Behavior Monitoring and Threat Detection

```
function MonitorBehavior(process):
  behavior_log = initialize empty_log( )
  while process is running:
    activity = analyze process.activities
    if detectSuspicious(activity):
      log "Malicious activity detected: ", activity
      quarantine process
      alert administrator
      save_snapshot(process)
    behavior_log.append(activity)
  return behavior_log
```

This pseudocode outlines the behavior monitoring module, which continuously analyzes the behavior of processes running within the sandboxed environment. Activities such as file access, network communication, and resource usage are monitored for suspicious patterns. If any anomaly is detected, the process is flagged, quarantined, and a detailed log of the activities is stored. An alert is sent to the administrator for review, along with a snapshot of the quarantined process. Behavior logs are appended for further analysis, enabling the system to identify recurring malicious patterns.

File System Virtualization

```
function VirtualizeFileAccess(process):
  virtual_file_system = createVirtualFileSpace( )
  allowed_files = fetchAllowedFiles(process)
  for access in process.file_requests:
    if access in allowed_files:
      grant access
    else:
      deny access
      log "Unauthorized file access attempt"
      alert administrator
```

The file system virtualization module pseudocode provides restricted file access to processes running within the sandbox. A virtualized file space is created, isolating the process's view of the file system. Allowed files are fetched from a pre-defined list specific to the process. If the process attempts to access unauthorized files, access is denied, the attempt is logged, and administrators are alerted. This approach prevents data leaks or tampering with critical files while maintaining process isolation.

Browser Extension Compatibility Analysis

```
function AnalyzeExtensions(browser_extensions):
  for extension in browser_extensions:
    metadata = extractMetadata(extension)
    compatibility_score = evaluateWithAI(metadata, user_preferences)
    if compatibility_score < threshold:
      suggestAlternative(extension)
      log "Incompatible extension detected: ", extension
```

The browser extension compatibility pseudocode focuses on analyzing extensions using generative AI. Each browser extension's metadata, including version, permissions, and runtime dependencies, is extracted and evaluated against system configurations and user preferences. The generative AI calculates a compatibility score for each extension. Extensions with scores below a predefined threshold are flagged as incompatible, and alternative extensions are suggested to the user. Logs are generated to document the evaluation process.

Feature Detection and Cross-Browser Testing

```
function DetectUnsupportedFeatures(web_application):
  unsupported_features = [ ]
  for feature in web_application.features:
    if not checkSupport(feature):
      unsupported_features.append(feature)
  return unsupported_features
function CrossBrowserTest(web_application):
  results = { }
  for browser in supported_browsers:
    result = testApplication(browser, web_application)
    results[browser] = analyzeDiscrepancies(result)
  return results
```

The feature detection module identifies unsupported features in web applications by iterating through web components such as APIs, scripts, or attributes and checking for compatibility. Any unsupported features are flagged for remediation. The cross-browser testing function runs automated tests of the web application across multiple browsers and collects results. Discrepancies in rendering, functionality, or performance are analyzed, and the results are logged to identify critical issues requiring attention.

JavaScript Debugging and Polyfill Implementation

```
function DebugJavaScript(script, browser):
  errors = analyzeScript(script, browser)
  for error in errors:
    alternative_function = fetchAlternative(error)
    replaceFunction(script, error, alternative_function)
  return script
function ApplyPolyfills(browser):
  required_polyfills = checkMissingFeatures(browser)
  for polyfill in required_polyfills:
    loadPolyfill(polyfill)
```

The JavaScript debugging module analyzes scripts for compatibility errors and replaces problematic functions with alternative implementations optimized for the target browser. Errors are resolved dynamically to ensure consistent functionality. The polyfill implementation module identifies missing features in legacy browsers and selectively loads the required polyfills. By supplementing missing functionalities, the module ensures that web applications can execute modern features in older browsers without compromising performance.

Performance Optimization and Compatibility Reporting

```
function OptimizePerformance(content, browser):
  optimized_content=adjustFormat(content, browser.supported_formats)
  return optimized_content
function GenerateCompatibilityReport(issues, fixes):
  report=initializeReport( )
  report.add("Detected Issues:", issues)
  report.add("Applied Fixes:", fixes)
  report.add("Performance Metrics:", calculateMetrics( ))
  return report
```

The performance optimization module adjusts content formats to match the capabilities of target browsers. For instance, media files such as videos are dynamically converted into optimized formats to reduce latency and improve rendering speed. The compatibility reporting module generates structured reports detailing detected issues, applied fixes, and system performance improvements. These reports include actionable insights to guide administrators in refining system configurations.

Thus, the foregoing pseudocode illustrates a systematic and modular approach to implementing various aspects of the inventions. Each module functions independently but communicates with other modules to ensure a cohesive system. The hybrid security model focuses on process isolation, resource optimization, behavior monitoring, and file system control to secure remote browser isolation environments. Suspicious processes are continuously monitored, flagged, and quarantined to contain potential threats. Meanwhile, browser compatibility remediation dynamically detects, analyzes, and resolves issues using generative AI and machine learning techniques. By addressing browser extension conflicts, unsupported features, and client-side errors, the system ensures consistent web application performance. Polyfills and performance optimizations further enhance the experience for legacy browsers. Compatibility reports and real-time analytics ensure administrators have visibility into system behavior, resource usage, and remediation processes. This approach integrates security and performance optimization seamlessly to deliver a robust, reliable, and future-ready system.

A skilled artisan, upon reviewing the disclosure, will appreciate that there are numerous alternatives, modifications, combinations, and customizations that can be made to the systems and methods described herein.

In particular, the systems and methods described herein for securing remote browser isolation environments and dynamically remediating browser compatibility issues are highly adaptable, and numerous alternatives, modifications, combinations, and customizations can be implemented without departing from the spirit and scope of the disclosure. These alternatives extend to changes in architecture, integration with additional technologies, enhanced functionality, and varied deployment methods to suit different environments and operational needs.

One alternative involves extending the sandboxing module to utilize containerization technologies such as Docker or Kubernetes for process isolation instead of conventional sandbox environments. Containers can provide lightweight and efficient isolation while ensuring greater portability across systems and platforms. Additionally, the sandboxing module could be modified to implement hypervisor-based virtual machines (VMs) for enhanced isolation in environments requiring stricter security controls, such as government or enterprise systems handling sensitive data. Combining containerization with virtual machines in a hybrid model can further optimize performance and security depending on the type of workload or process.

The behavior monitoring module can incorporate advanced anomaly detection models using deep learning techniques, such as recurrent neural networks (RNNs) or generative adversarial networks (GANs), to improve the accuracy of detecting unauthorized or suspicious behavior. Customizations may include adding support for behavioral baselining, where the system learns the typical behavior of processes over time and flags deviations more effectively. The behavior monitoring system could also be modified to integrate with external threat intelligence platforms to cross-reference detected anomalies with known threat databases, enabling faster identification of malicious activities. Furthermore, combining behavioral monitoring with signature-based detection methods provides a robust, multi-layered security solution.

The resource management module can be enhanced to include predictive resource allocation algorithms that utilize machine learning to anticipate resource demands based on historical patterns. For instance, resources such as CPU, memory, and bandwidth can be pre-allocated to processes expected to require more resources during peak usage. Modifications could also include integration with cloud-based resource scaling solutions that allow dynamic allocation of resources across on-premises and cloud environments. This approach enables greater scalability for systems experiencing high loads and ensures consistent performance. Additionally, combinations of resource throttling, priority scheduling, and real-time load balancing can be implemented to maximize resource efficiency.

The network access control module could be customized to implement software-defined networking (SDN) technologies, enabling more granular and dynamic control over network resources. Network segmentation policies could be enhanced with AI-driven algorithms that adapt network priorities based on real-time traffic patterns and task criticality. In an alternative embodiment, the network control module can integrate end-to-end encryption protocols for securing communications between isolated processes and external systems, ensuring that sensitive data transmitted over networks remains protected.

The file system virtualization module may be modified to implement immutable storage environments for processes, where virtualized file systems are set to a read-only mode to prevent tampering with sensitive files. Alternatives include the use of blockchain-based file access verification, where access requests are logged and verified against a decentralized ledger to ensure traceability and integrity. File system virtualizations could also include differential access permissions, where processes operating under different security profiles receive dynamically adjusted permissions based on their trust level or operational requirements.

In the context of browser compatibility remediation, the browser extension compatibility module could be enhanced to integrate user-driven customization tools that allow administrators to define compatibility thresholds and preferences. Modifications may include expanding the module to support automatic rollback capabilities where incompatible browser extensions are temporarily disabled, and previous configurations are restored until alternatives are available. The module could also utilize real-time crowd-sourced feedback, where users contribute compatibility insights to refine generative AI recommendations for extensions.

The feature detection module may include advanced AI-driven simulations for unsupported APIs or scripts, where the module dynamically generates virtualized environments to test alternative implementations before applying them. Customizations could also integrate API emulation libraries that mimic the behavior of unsupported APIs to ensure functional consistency without requiring extensive rewriting of the original code. For legacy systems, the module could support incremental feature upgrading, where modern capabilities are gradually added while ensuring backward compatibility.

The cross-browser testing module can be extended to incorporate real-time test orchestration frameworks that execute parallel tests across various browser environments using distributed computing resources. Modifications could include implementing visual regression testing tools to identify rendering inconsistencies by comparing snapshots of the application across browsers. The cross-browser testing module could also include integration with performance monitoring tools, enabling deeper analysis of discrepancies caused by resource usage, network delays, or script execution bottlenecks.

The JavaScript debugging module can be enhanced to support automatic script optimization, where problematic JavaScript code is not only replaced but also refactored to improve performance. An alternative approach could involve combining the debugging module with runtime monitoring tools that evaluate JavaScript performance in real time and optimize script execution dynamically. The module could also be customized to provide browser-specific compatibility libraries, offering pre-tested JavaScript alternatives for specific browser environments.

The CSS normalization module could be extended to include adaptive styling mechanisms that adjust visual attributes dynamically based on screen size, device type, or user preferences. Combinations with responsive design frameworks allow the system to dynamically generate optimized stylesheets that ensure consistent rendering across a variety of resolutions and aspect ratios. The module can further incorporate dynamic color and theme adjustments to enhance accessibility for users with visual impairments or specific display requirements.

The polyfill implementation module may be customized to implement on-demand polyfill loading, where runtime scripts are loaded only for the features actively utilized by the application. Modifications could include expanding support for modular polyfill libraries that provide lightweight, customized scripts based on the specific browser version or feature gaps. This approach minimizes resource overhead while maintaining compatibility for older browsers.

The performance optimization module can include predictive performance modeling, where the system anticipates performance bottlenecks based on historical behavior and proactively optimizes resource allocation, media content, and APIs. Alternatives may involve integration with content delivery networks (CDNs) to offload and accelerate media file delivery, particularly for web applications with heavy multimedia content. The system could also support runtime media transcoding, enabling dynamic conversion of media files to formats better suited for specific browsers or devices.

The compatibility monitoring module can integrate predictive analytics dashboards that visualize compatibility trends over time, enabling administrators to forecast future issues and take preemptive measures. Alternatives include combining the monitoring module with automated CI/CD pipelines, ensuring compatibility updates are seamlessly integrated into development workflows. Modifications can further include support for AI-assisted remediation strategies, where the system autonomously applies fixes based on previously successful resolutions.

The reporting module can be customized to generate interactive analytics dashboards with drill-down capabilities, enabling administrators to analyze compatibility issues at a granular level. Reports could include customized KPIs for browser compatibility, resource optimization, and remediation effectiveness. Additionally, the reporting module could integrate with threat intelligence systems to provide insights into potential vulnerabilities related to browser compatibility issues.

Alternative embodiments could involve combining the security model and compatibility remediation system with cloud-based deployment models, enabling enterprises to leverage scalable, remote environments for browser isolation and compatibility management. The systems may also be integrated with endpoint security solutions to extend the protections beyond isolated processes and ensure holistic security for users. Modifications could include integrating user behavior analytics (UBA) to customize compatibility remediation strategies based on individual user workflows and browser usage patterns.

Finally, combinations of the security and compatibility systems with enterprise monitoring tools, such as Security Information and Event Management (SIEM) systems or orchestration platforms, enable centralized visibility, control, and reporting. Customizations may include enabling policy-driven automation frameworks that automatically enforce compatibility and security policies based on real-time analytics. These alternatives, modifications, combinations, and customizations provide an adaptable and scalable framework that meets the evolving requirements of diverse technological environments without deviating from the spirit and scope of the disclosure.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for securing remote browser isolation (RBI) environments to protect against web-based threats while ensuring efficient execution of web applications, the method comprising:

executing, by a sandboxing module within a remote browser isolation environment, a critical application or process in an isolated compartment, wherein the compartment prevents the application or process from interfering with or impacting other processes running within a system;

allocating, by a process isolation algorithm implemented by a resource management component, dedicated system resources including CPU, memory, and network bandwidth to individual processes to ensure independent execution and prevent resource contention between processes;

restricting, by a resource limitation algorithm implemented by the resource management component, consumption of system resources by each process, wherein the resources include CPU cycles, memory usage, and disk space, such that each process is dynamically allocated only the necessary resources for execution of each process;

prioritizing, by a network access control module, network resources to individual processes based on task sensitivity, wherein high-priority tasks are dynamically assigned dedicated network resources to ensure uninterrupted communication while lower-priority tasks share remaining bandwidth;

virtualizing, by a file system virtualization module, file system access for processes running within the remote browser isolation environment, wherein the virtualization module limits read and write access to only specific files required for a given process, preventing unauthorized access to other files or system resources;

analyzing, by a behavior monitoring module, real-time system activities within the remote browser isolation environment to identify unauthorized or suspicious behavior, wherein the module generates alerts for detected anomalies such as unauthorized file access, abnormal network activity, or malicious script execution;

remediating, by a dynamic compatibility module, browser compatibility issues by conducting cross-browser testing, wherein the module tests the performance and functionality of web applications across different browsers and browser versions to detect discrepancies and incompatibilities;

identifying, by a feature detection module, unsupported browser features, APIs, or script versions used in a web application, and dynamically generating alternative configurations or implementations that replicate intended behavior of the unsupported features;

adjusting, by a Cascading Style Sheets (CSS) normalization module, layout and style of a web application to ensure uniform rendering and visual consistency across multiple browsers, wherein the module dynamically generates a generic stylesheet compatible with the browsers in the RBI environment;

correcting, by a JavaScript error debugging module, client-side script errors by analyzing browser-specific execution requirements, dynamically replacing incompatible scripts with alternative implementations, and ensuring smooth execution of the web application in all browser environments;

integrating, by a polyfill implementation module, runtime scripts or APIs to enable modern web features in legacy browsers, wherein unsupported features are dynamically supplemented with equivalent implementations to ensure consistent functionality;

converting, by a performance optimization module, file formats and adjusting API versions to improve execution performance across diverse browsers, wherein media content or APIs incompatible with certain browsers are replaced or optimized for efficient operation;

monitoring, by the dynamic compatibility module, real-time updates to web applications and analyzing historical and current compatibility data to predict emerging browser compatibility issues and proactively generate solutions to ensure seamless functionality;

white-listing, by an application white-listing module, trusted applications or APIs that bypass the remote browser isolation environment, wherein the trusted applications or APIs are authenticated based on a pre-defined white-list, allowing them to execute directly without requiring additional verification or security checks;

detecting, by the behavior monitoring module, any attempt by an unauthorized or untrusted application to execute within the remote browser isolation environment, wherein such attempts are flagged, isolated, and prevented from further operation;

dynamically reallocating, by the resource management component, system resources upon completion of a process, wherein resources are released and made available for subsequent processes to optimize overall system performance; and isolating, by the sandboxing module, any process exhibiting suspicious behavior as detected by the behavior monitoring module, wherein the process exhibiting suspicious behavior is quarantined to prevent propagation of malicious activity within the remote browser isolation environment, resource allocation of the process exhibiting suspicious behavior is revoked, and a snapshot of an execution state of the process exhibiting suspicious behavior is stored for forensic analysis; and generating, by a security reporting module, detailed reports for detected compatibility issues and security anomalies, wherein the reports include identified discrepancies, flagged processes, resource usage metrics, activity logs, and snapshots for administrative review, further enabling forensic investigation and remediation actions.

2. The method of claim 1, wherein the sandboxing module further includes isolating applications based on a predefined security policy, such that specific applications handling sensitive data are placed in sandboxed compartments with stricter execution controls.

3. The method of claim 2, wherein the resource management component further comprises dynamically monitoring resource usage of each process and reallocating additional CPU, memory, or disk space based on changing process demands.

4. The method of claim 3, wherein the network access control module further determines network resource prioritization based on task classification, wherein classification includes high-priority, medium-priority, and low-priority tasks based on sensitivity or criticality of the processes.

5. The method of claim 4, wherein the file system virtualization module restricts file access by assigning unique virtualized file system instances to each process, preventing processes from accessing shared or system-critical files.

6. The method of claim 5, wherein the behavior monitoring module further comprises analyzing system logs and historical activity patterns to identify recurring unauthorized behaviors or anomalies within the remote browser isolation environment.

7. The method of claim 6, wherein the application white-listing module allows bypass of trusted applications or APIs only after validating their signatures, certificates, or hashes to ensure their authenticity and integrity.

8. The method of claim 7, wherein the resource management component further comprises enforcing resource usage thresholds for each process, and upon exceeding a threshold, throttling the process to prevent degradation of overall system performance.

9. The method of claim 8, wherein the behavior monitoring module dynamically generates a report detailing all detected suspicious activities, flagged processes, and security alerts for review by an administrative entity.

10. The method of claim 9, wherein the sandboxing module, upon quarantining a process flagged as malicious by the behavior monitoring module, further comprises:

identifying, by the behavior monitoring module, specific activities, files, or network communications that triggered the flagging of the process as malicious;

terminating, by the sandboxing module, the execution of the flagged process to prevent further operations or propagation of potential threats;

isolating, by the sandboxing module, all related system resources, including allocated CPU, memory, and disk space, associated with the flagged process to ensure no residual activity remains;

generating, by the behavior monitoring module, a detailed security incident report that includes identified malicious behavior, affected system components, and associated resource usage for administrative analysis; and storing, by the file system virtualization module, a snapshot of the quarantined process's state, including file dependencies, logs, and execution data, for further forensic investigation and potential remediation steps.

11. A system comprising hardware for securing remote browser isolation (RBI) environments to protect against web-based threats while ensuring efficient execution of web applications, the system comprising:

a sandboxing module configured to execute critical applications or processes in isolated compartments within a remote browser isolation environment, wherein the sandboxing module prevents interference between processes and contains any malicious activity or failures within the isolated compartments;

a process isolation algorithm, implemented by a resource management component, configured to allocate dedicated system resources, including CPU, memory, and network bandwidth, to individual processes to ensure independent execution and prevent resource contention between tasks;

a resource limitation algorithm, implemented by the resource management component, configured to restrict resource consumption for each process, wherein the resource limitation algorithm dynamically assigns CPU cycles, memory usage, and disk space required for a process and prevents resource monopolization;

a network access control module configured to prioritize network resources for individual processes based on task sensitivity, wherein high-priority processes are assigned dedicated network bandwidth to ensure uninterrupted communication while lower-priority processes share remaining network resources;

a file system virtualization module configured to restrict file access for processes running in the remote browser isolation environment, wherein the file system virtualization module assigns read and write permissions to only specific files required for the execution of a process, preventing unauthorized access to other files or system resources;

a behavior monitoring module configured to analyze real-time system activities within the remote browser isolation environment, wherein the behavior monitoring module identifies unauthorized or suspicious behavior, including abnormal file access, network activity, or execution patterns, and generates alerts for administrative review;

a dynamic compatibility module is configured to remediate browser compatibility issues by conducting cross-browser testing, wherein the module tests the performance and functionality of web applications across different browsers and browser versions to detect discrepancies and incompatibilities;

a feature detection module is configured to identify unsupported browser features, APIs, or script versions used in a web application, and dynamically generating alternative configurations or implementations that replicate intended behavior of the unsupported features;

a Cascading Style Sheets (CSS) normalization module is configured to adjust a layout and style of a web application to ensure uniform rendering and visual consistency across multiple browsers, wherein the module dynamically generates a generic stylesheet compatible with the browsers in the RBI environment;

a JavaScript error debugging module is configured to correct client-side script errors by analyzing browser-specific execution requirements, dynamically replacing incompatible scripts with alternative implementations, and ensuring smooth execution of the web application in all browser environments;

a polyfill implementation module is configured to integrate runtime scripts or APIs to enable modern web features in legacy browsers, wherein unsupported features are dynamically supplemented with equivalent implementations to ensure consistent functionality;

a performance optimization module is configured to convert file formats and adjusting API versions to improve execution performance across diverse browsers, wherein media content or APIs incompatible with certain browsers are replaced or optimized for efficient operation;

wherein the dynamic compatibility module is configured to monitor real-time updates to web applications and analyze historical and current compatibility data to predict emerging browser compatibility issues and proactively generate solutions to ensure seamless functionality;

an application white-listing module configured to allow trusted applications or APIs to bypass the remote browser isolation environment, wherein trusted applications or APIs are identified and verified using a pre-defined white-list to execute directly without requiring additional authentication;

a threat detection component, integrated with the behavior monitoring module, configured to isolate processes exhibiting suspicious or malicious activity, wherein the threat detection component flags, terminates, and quarantines the processes exhibiting suspicious or malicious activity to prevent propagation of threats within the system, revokes resource allocation of the processes exhibiting suspicious or malicious activity, generates a snapshot of an execution state the processes exhibiting suspicious or malicious activity and stores the snapshot for forensic analysis;

a dynamic resource manager, implemented by the resource management component, configured to reallocate system resources upon completion of individual processes, wherein the dynamic resource manager ensures that released resources are reassigned to other tasks to optimize overall system performance; and a security reporting module, communicatively coupled with the behavior monitoring module, configured to generate detailed incident reports for flagged or terminated processes, wherein the reports include identified malicious behavior, associated resource usage, snapshots and logs for forensic analysis and administrative remediation.

12. The system of claim 11, wherein the sandboxing module further comprises a policy enforcement engine configured to determine isolation levels for processes based on predefined security policies, wherein sensitive processes are assigned stricter isolation parameters.

13. The system of claim 12, wherein the process isolation algorithm further monitors the resource usage of each process in real time and dynamically reallocates additional CPU, memory, or disk resources to processes experiencing increased demands while ensuring no disruption to other processes.

14. The system of claim 13, wherein the network access control module further implements network segmentation by categorizing processes into priority levels and restricting lower-priority processes to specific network segments to minimize latency and prevent interference with critical tasks.

15. The system of claim 14, wherein the file system virtualization module generates unique virtual file system instances for each isolated process, ensuring that file operations by one process are invisible and inaccessible to other processes within the remote browser isolation environment.

16. The system of claim 15, wherein the behavior monitoring module further utilizes machine learning to analyze historical activity patterns and identify recurring behaviors or anomalies that indicate potential threats within the remote browser isolation environment.

17. The system of claim 16, wherein the application white-listing module verifies the integrity of trusted applications or APIs by checking cryptographic signatures, hashes, or certificates before allowing them to bypass the remote browser isolation environment.

18. The system of claim 17, wherein a threat detection component quarantines flagged processes by storing snapshots of a process state, including resource usage data, execution logs, and file dependencies, to enable forensic investigation and further remediation actions.

19. The system of claim 18, wherein the security reporting module further generates real-time alerts for flagged processes, the alerts including detailed information about a nature of the suspicious activity, such as specific system files accessed, abnormal network communications attempted, or unauthorized execution patterns detected, and transmits the alerts, along with comprehensive incident reports, to an administrative console, a security information and event management (SIEM) system, or a centralized threat management platform;

wherein the incident reports include a timestamped log of the flagged process's activities, resource consumption metrics, identified malicious behavior, and any associated virtual file system operations;

wherein the security reporting module further provides forensic snapshots of the quarantined processes' state, including execution data, file dependencies, network communication logs, and resource allocation details, to facilitate root cause analysis, threat intelligence gathering, and remediation efforts; and wherein the administrative console or SIEM system receives the alerts and incident reports in a format that supports automated correlation, analysis, and prioritization of security events, enabling security administrators to take immediate corrective actions, update security policies, and strengthen the system's defense mechanisms against recurring or emerging threats.

20. A method for securing remote browser isolation (RBI) environments to protect against web-based threats while dynamically remediating browser compatibility issues, the method comprising:

executing, by a sandboxing module within the remote browser isolation environment, critical applications or processes in isolated compartments, wherein the sandboxing module prevents interference between processes and contains potential malicious activity within the isolated compartments;

allocating, by a process isolation algorithm implemented by a resource management component, dedicated system resources including CPU, memory, and network bandwidth to individual processes to ensure independent execution and prevent resource contention among tasks;

restricting, by a resource limitation algorithm implemented by the resource management component, system resource consumption for each process, wherein resources such as CPU cycles, memory, and disk space are dynamically assigned to processes to ensure optimized utilization and uninterrupted performance;

prioritizing, by a network access control module, network resources for individual processes based on task sensitivity, wherein high-priority tasks are allocated dedicated network bandwidth while lower-priority tasks share remaining network capacity;

virtualizing, by a file system virtualization module, file system access for processes within the remote browser isolation environment, wherein the module restricts read and write permissions to only specific files required for task execution to prevent unauthorized access;

analyzing, by a behavior monitoring module, real-time system activities to identify suspicious or unauthorized behaviors, wherein detected anomalies, such as abnormal network activities, unauthorized file access, or malicious scripts, are flagged, reported, and contained;

remediating, by a dynamic compatibility module, browser compatibility issues by conducting cross-browser testing, wherein the module tests the performance and functionality of web applications across different browsers and browser versions to detect discrepancies and incompatibilities;

identifying, by a feature detection module, unsupported browser features, APIs, or script versions used in a web application to be executed within the RBI, and dynamically generating alternative configurations or implementations that replicate intended behavior of the unsupported features;

adjusting, by a Cascading Style Sheets (CSS) normalization module, layout and style of a web application to ensure uniform rendering and visual consistency across multiple browsers, wherein the module dynamically generates a generic stylesheet compatible with browsers in the RBI environment;

correcting, by a JavaScript error debugging module, client-side script errors by analyzing browser-specific execution requirements, dynamically replacing incompatible scripts with alternative implementations, and ensuring smooth execution of the web application in all browser environments;

integrating, by a polyfill implementation module, runtime scripts or APIs to enable modern web features in legacy browsers, wherein unsupported features are dynamically supplemented with equivalent implementations to ensure consistent functionality;

converting, by a performance optimization module, file formats and adjusting API versions to improve execution performance across diverse browsers, wherein media content or APIs incompatible with certain browsers are replaced or optimized for efficient operation;

monitoring, by the dynamic compatibility module, real-time updates to web applications and analyzing historical and current compatibility data to predict emerging browser compatibility issues and proactively generate solutions to ensure seamless functionality;

white-listing, by an application white-listing module, trusted applications or APIs that bypass the remote browser isolation environment, wherein trusted applications are verified based on a pre-defined white-list and allowed to execute without additional authentication;

isolating and terminating, by the sandboxing module, any process exhibiting suspicious behavior as detected by the behavior monitoring module, wherein a flagged process is quarantined, resource allocation of the flagged process is revoked, and a snapshot of an execution state of the flagged process is stored for forensic analysis; and generating, by a security reporting module, detailed reports for detected compatibility issues and security anomalies, wherein the reports include identified discrepancies, flagged processes, resource usage metrics, activity logs, and snapshots for administrative review, further enabling forensic investigation and remediation actions.

* * * * *